United States Patent Office 3,545,185
Patented Dec. 8, 1970

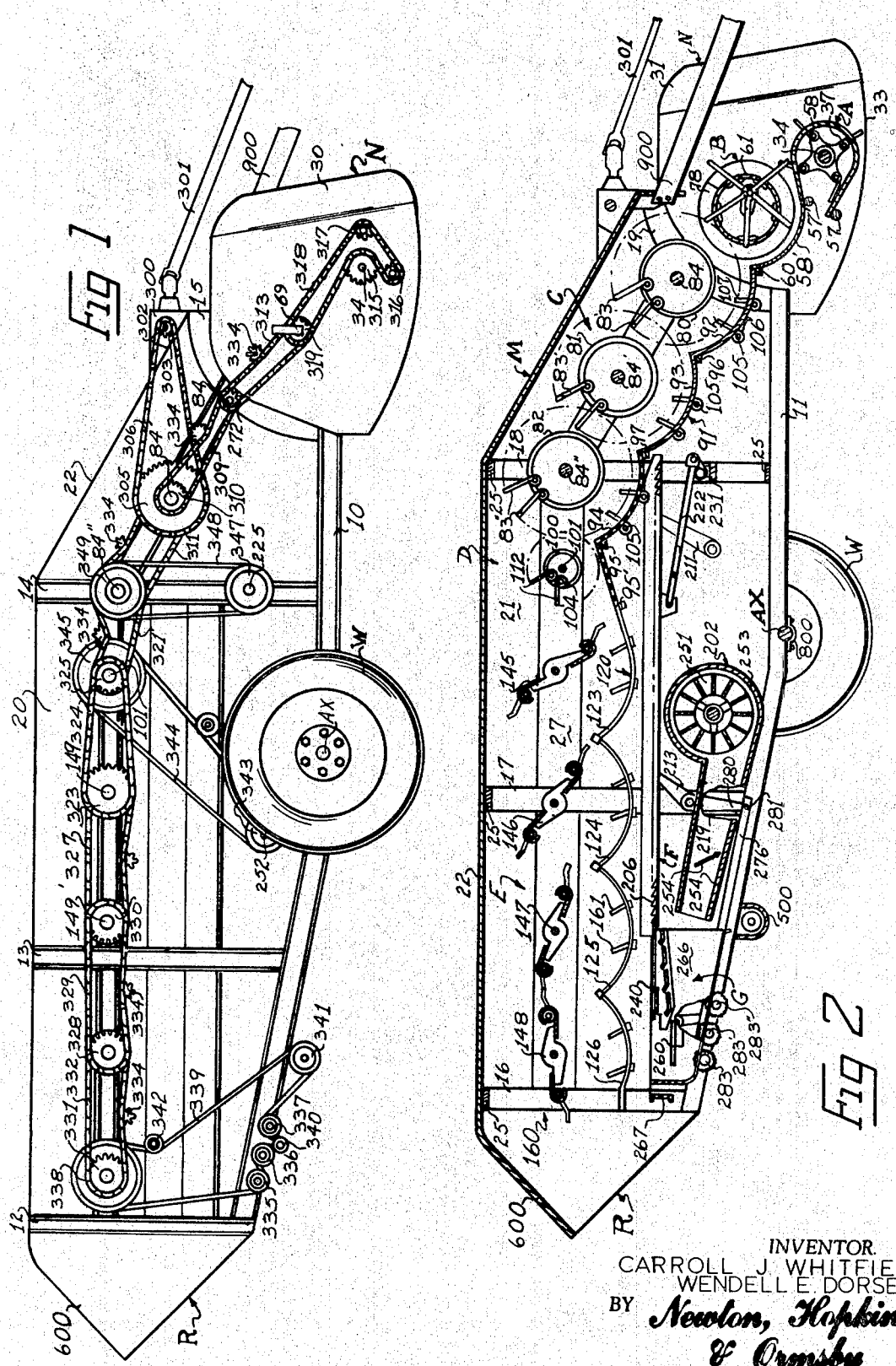

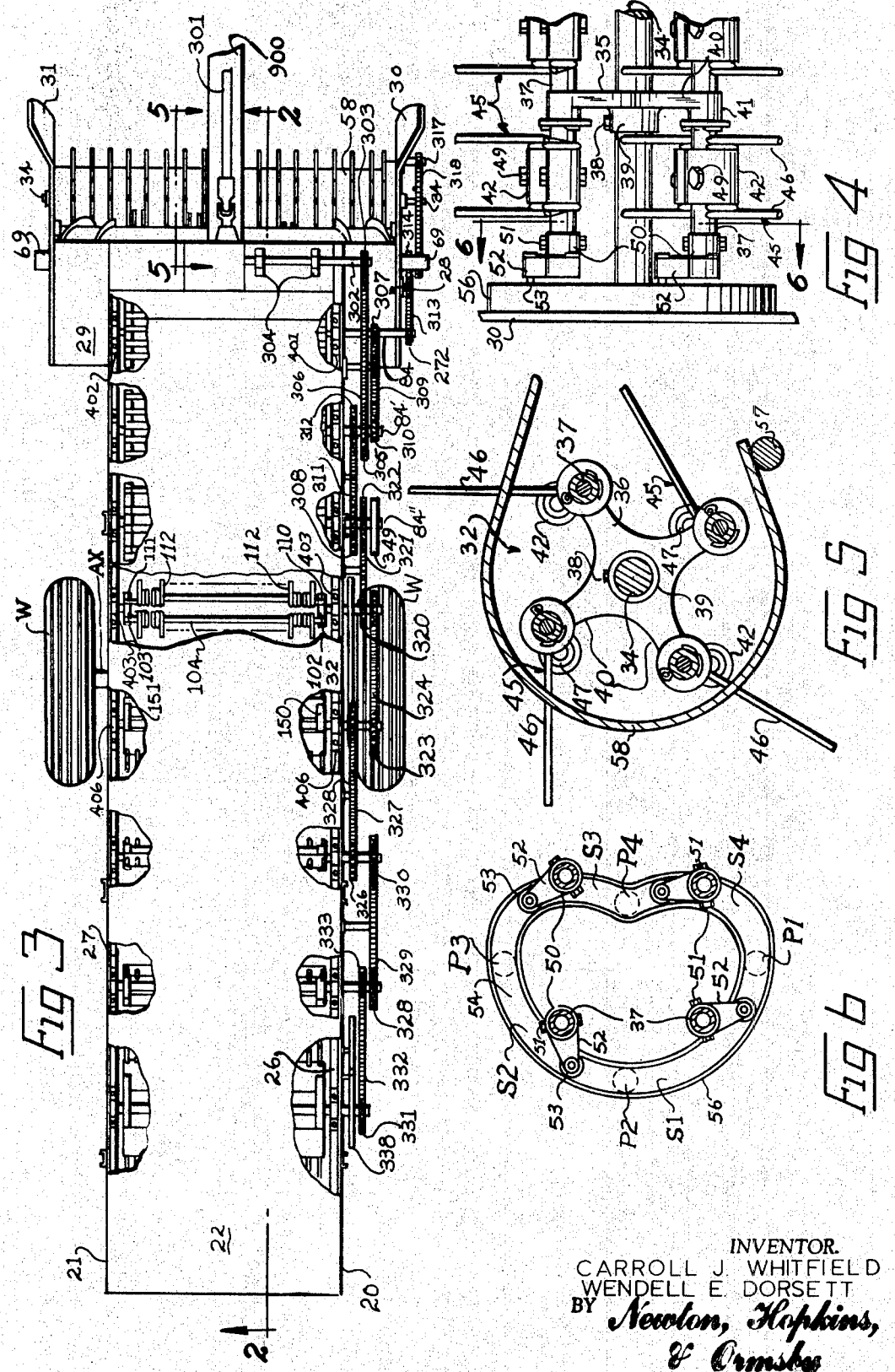

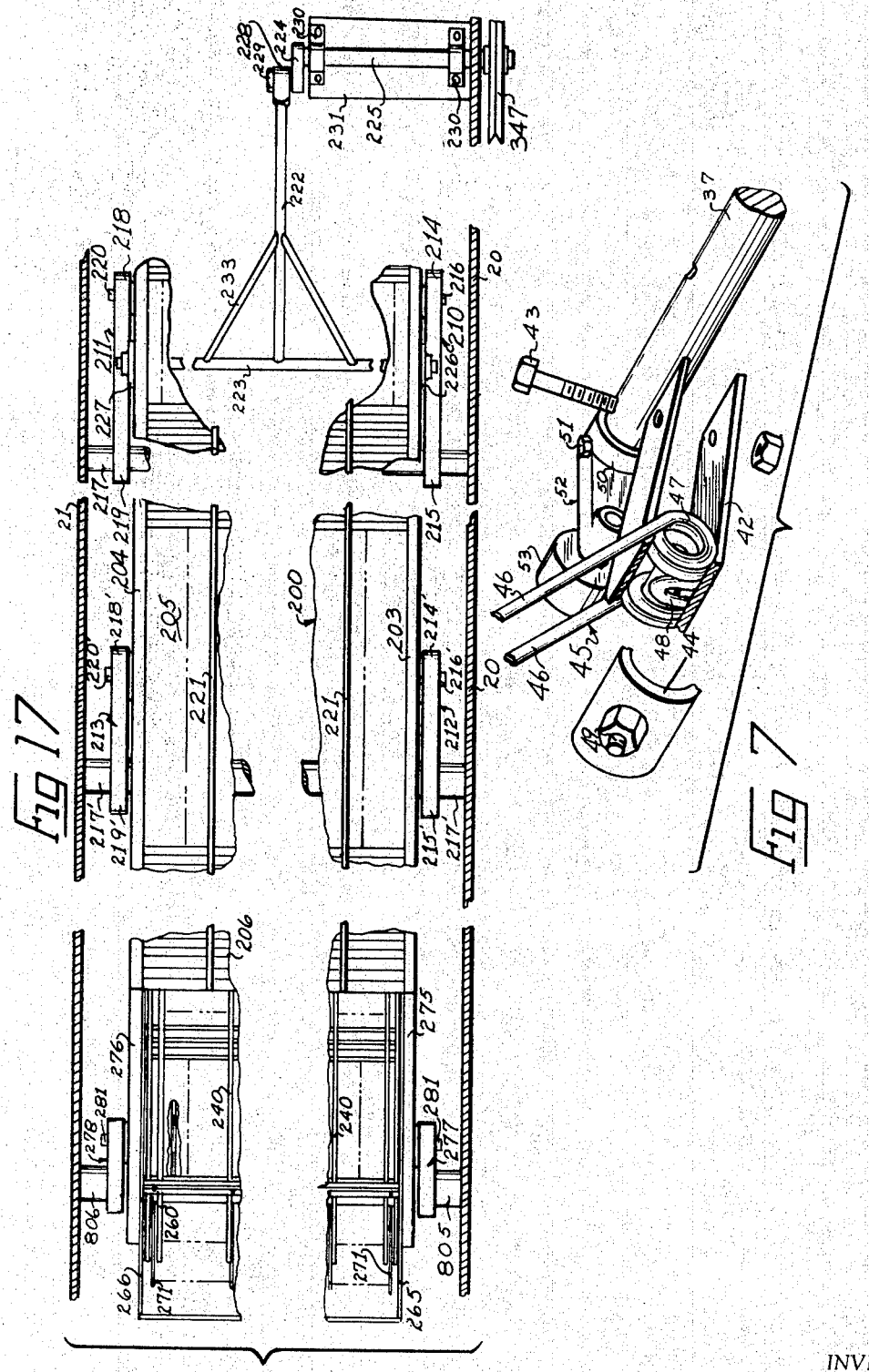

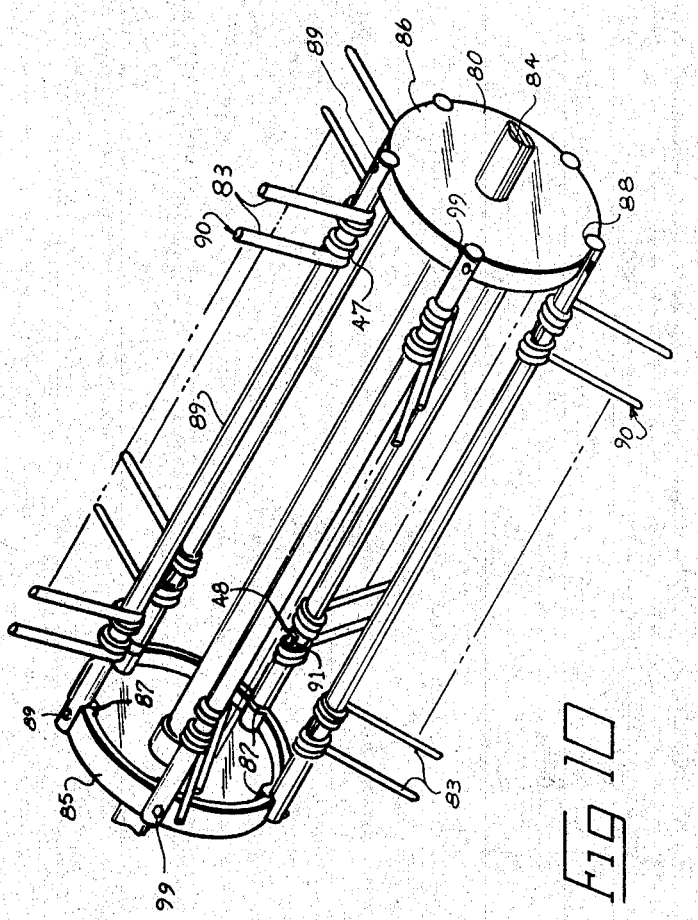

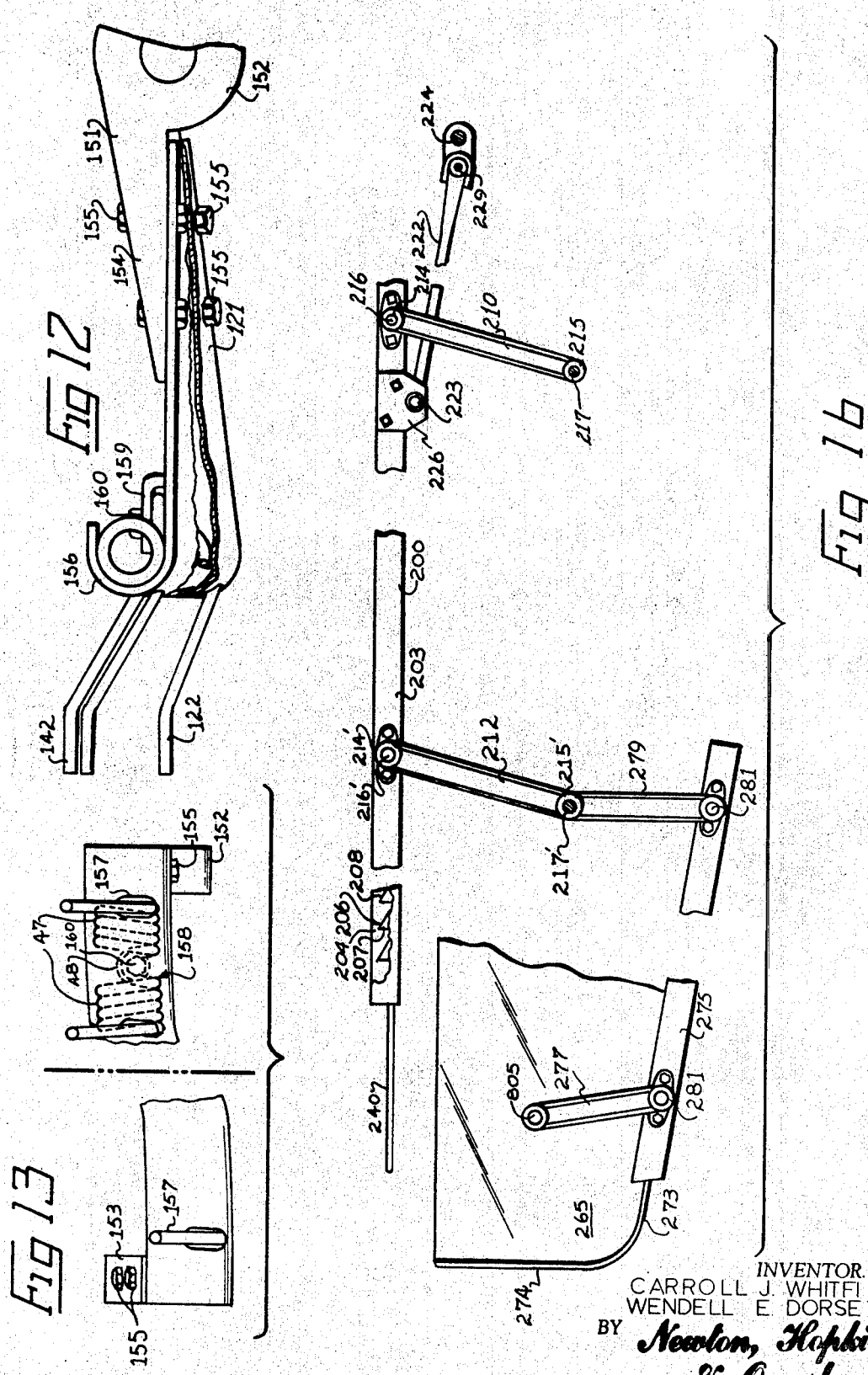

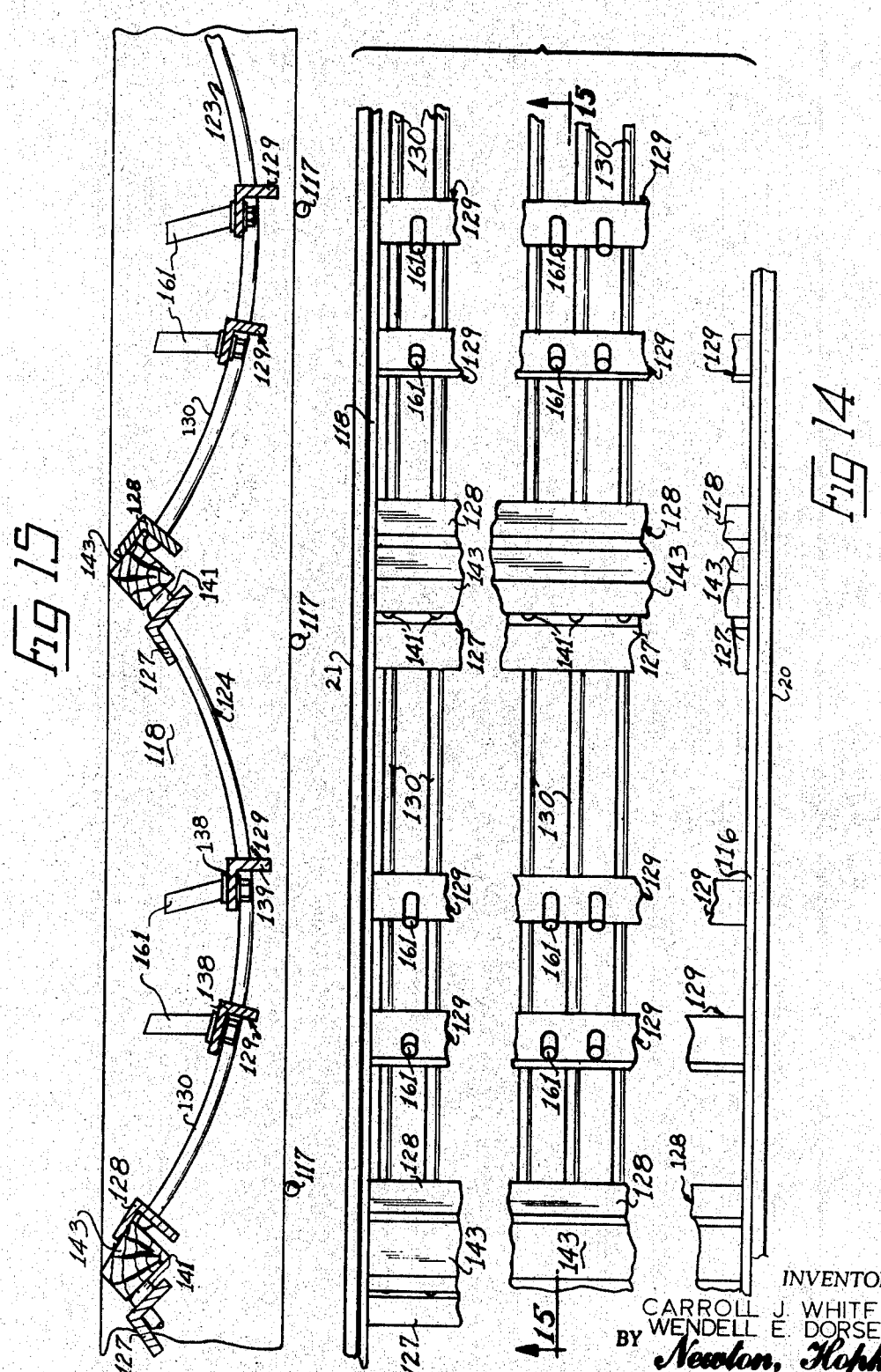

3,545,185
PEANUT COMBINE
Carroll J. Whitfield, Columbus, Ga., and Wendell E. Dorsett, Gering, Nebr., assignors to Lilliston Corporation, Albany, Ga., a corporation of Georgia
Application Sept. 21, 1966, Ser. No. 581,119, now Patent No. 3,404,517, dated Oct. 8, 1968, which is a continuation of application Ser. No. 329,404, Dec. 10, 1963. Divided and this application Aug. 21, 1968, Ser. No. 754,313
Int. Cl. A01d 89/00
U.S. Cl. 56—19     8 Claims

ABSTRACT OF THE DISCLOSURE

This invention relates to a peanut combine including means for picking up peanut-laden vines arranged in windrows. More particularly, this invention includes a main frame having a picking cylinder positioned for rotation therein. Mounted on the main frame forward of the picking cylinder is a pickup section including a rotatably mounted pickup drum having a series of spring fingers. Supported on the main frame intermediate the picking cylinder and pickup drum is a rotatably mounted feed drum having a pair of opposed helical flange means and a series of spring fingers. The pickup section and feeder drum are detailed in width to be wider than the picking cylinder for picking up peanut-laden vines from windrows having a composite width greater than the width of the picking cylinder and for reducing the width of the picked up vines and transferring the vines to the picking cylinder.

---

This application is a division of our copending application Ser. No. 581,119, filed Sept. 21, 1966, now U.S. Pat. 3,404,517 which was a continuation of Ser. No. 329,404, filed Dec. 10, 1963, now abandoned.

This invention relates to combines and more particularly to a peanut combine for picking up peanut-laden peanut vines arranged in windrows, for picking the peanuts from the peanut vines, for separating the peanuts from the peanut vines and debris, for cleaning debris from the peanuts, for removing the stems from the peanuts, and for discharging the peanuts to a container.

In the harvesting and threshing of peanuts, the peanut vines must be gathered and the peanuts picked from the vines, cleaned, and placed in convenient containers such as bins or sacks. This is most conveniently accomplished by placing the peanut-laden peanut vines in windrows and by using a combine to perform the operations of removing the windrows of peanut vines from the ground, picking the peanuts from the peanut vines, separating the peanuts from the peanut vines and debris in the windrows, cleaning the peanuts, and cutting the stems from the peanuts.

Previous peanut combines have not efficiently accomplished these operations with the result that peanuts have been lost because of the failure of the combine to pick some peanuts from the peanut vines or to separate some peanuts from the peanut vines or with the result that the peanuts are delivered to a bin, sack or other container not fully cleaned. Moreover, previous peanut combines have been characterized by excessive jarring and vibration. This is unpleasant to the operator of the combine and increases the amount of maintenance required. In addition, previous peanut combines have tended to become easily clogged with peanut vines and have been characterized by widths substantially equal to the width of the windrows. These combine widths have caused these previous peanut combines to be excessively heavy and difficult to move and to be relatively expensive to manufacture.

The peanut combine disclosed herein accomplishes the operations necessary to pick up windrows of peanut-laden peanut vines and to deliver peanuts cleaned and stemmed to a bin, sack or other container in a highly efficient manner with substantially no loss of peanuts because of the failure of the combine to pick or separate peanuts from the peanut vines. Moreover, the peanut combine disclosed herein accomplishes these operations without the undesirable jarring and vibration which have characterized previous peanut combines.

In addition, the peanut combines disclosed herein is capable of picking up windrows of peanut vines substantially wider than the combine as a whole. The small width of the combine as a whole relative to the width of the windrows which the combine is capable of picking from the ground makes the combine disclosed herein relatively inexpensive to manufacture and relatively light and easy to move over the windrows of peanut vines.

The peanut combine disclosed herein has a picking section in which the peanuts are picked from the peanut vines and a separating section in which substantially all picked peanuts are separated from the peanut vines and the combine provides for the positive transfer of the peanut vines and peanuts from the picking section to the separating section. This and other structural features of the peanut combine of the invention avoid the tendency of previous peanut combines to become easily clogged with peanut vines and debris and provide a combine with good handling and operating characteristics.

These and other features and advantages of the invention will be more clearly understood from the following detailed description and the accompanying drawings in which like characters of reference designate corresponding parts in all figures and in which:

FIG. 1 is a side eleavtion view of the right side of the combine.

FIG. 2 is a vertical sectional view of the combine taken along lines 2—2 of FIG. 3.

FIG. 3 is a top plan view of the combine with portions of the cover plate cut away to show the mounting of the picking cylinders and paddle assemblies.

FIG. 4 is a fragmentary front elevation view of the right end of the pickup drum in the pickup section of the combine.

FIG. 5 is a section view toward the right side of the combine as viewed along lines 5—5 of FIG. 3.

FIG. 6 is a vertical sectional view taken along lines 6–6 of FIG. 4 showing the cam member used to control the motion of the spring fingers in the pickup section of the comibne as seen from the left side of the combine.

FIG. 7 is an exploded view of a clamp and spring finger assembly in the pickup section of the combine.

FIG. 10 is a perspective view of one of the plurality of picking cylinders in the picking section of the combine.

FIG. 12 is an enlarged side elevation view of a portion of one of the plurality of paddle assemblies in the separating section of the combine as seen from the left side of the combine.

FIG. 13 is a fragmentary top plan view of one of the plurality of paddle assemblies in the separating section of the combine.

FIG. 14 is a top plan view of a portion of the separating section of the combine.

FIG. 15 is a vertical sectional view of a portion of the separating screen in the separating section of the combine as viewed along lines 15—15 of FIG. 14.

FIG. 16 is a side elevation view of the tray in the cleaning section of the combine and of the stemmer bottom in the stemming section of the combine showing the manner in which oscillatory motion is imparted to the tray and stemmer bottom.

FIG. 17 is a top plan view of the tray in the cleaning section of the combine and of the stemmer bottom and stemmers in the stemming section of the combine.

Figure 8:
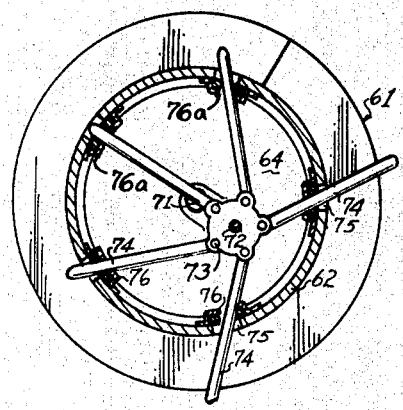
FIG. 8 is a fragmentary front elevation view of the right end of the feeder drum in the feeder section of the combine.
Figure 9:
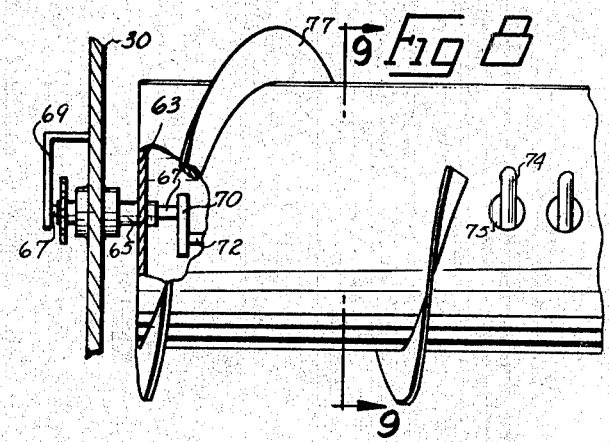
FIG. 9 is a section view of the feeder drum taken along lines 9—9 of FIG. 8.
Figure 11:
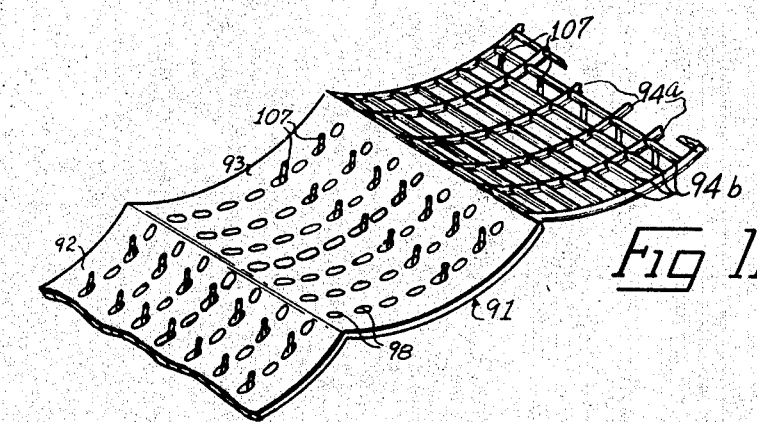
FIG. 11 is a perspective view of the breastplate and the discharge screen in the picking section of the combine.
Figure 18:
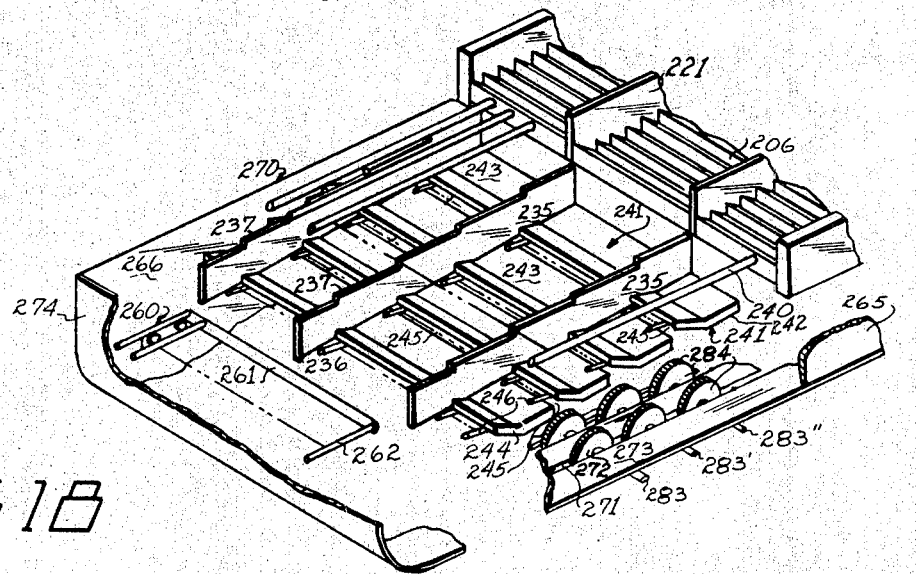
FIG. 18 is a perspective view of the tray, vine rods and slated platform in the cleaning section of the combine and of the stemmers and stemmer bottom in the stemming section of the combine.

These figures and the following detailed description disclose a preferred specific embodiment of the invention but the invention is not limited to the details disclosed since it may be embodied in other equivalent forms.

The peanut combine of the invention is best understood as comprising a pickup section generally indicated by the letter A, a feeder section generally indicated by the letter B, a picking section generally indicated by the letter C, a transfer section generally indicated by the letter D, a separating section generally indicated by the letter E, a cleaning section generally indicated by the letter F, and a stemming section generally indicated by the letter G. These sections A, B, C, D, E, F and G are within or attached to a frame generally indicated by the letter M. The frame M is supported by wheels W mounted on an axle AX extending generally beneath and transverse to the lengthwise axis of the frame M. This arrangement permits the frame M and the peanut combine of the invention as a whole to be drawn behind a tractor or other suitable means for moving the combine along a windrow of peanut vines having peanuts attached.

The frame M has longitudinal members 10 and 11 attached in known manner by bearing members 800 to the axle AX. Vertical members 12, 13, 14 and 15 are fixedly attached to and extend upward from the longitudinal member 10 and vertical members 16, 17, 18 and 19 are fixedly attached to and and extend upward from the longitudinal member 11. Transverse members 25 extend between the upper ends of the vertical members 12, 13, 14 and 15 and the upper ends of the vertical members 16, 17, 18 and 19 and between the longitudinal members 10 and 11 so as to provide with the longitudinal members 10 and 11 and the vertical members 12, 13, 14, 15, 16, 17, 18 and 19 a substantially rigid rectangular box supported by the wheels W. A right side 20 is attached by welding or other known means to the vertical members 12, 13, 14 and 15 and a left side 21 is attached by welding or other known means to the vertical members 16, 17, 18 and 19. A cover plate 22 joins the upper edge of the right side 20 and the upper edge of the left side 21 so that the box formed is substantially closed on three sides.

A right support member 26 extends along the length of the right side 20 of the frame M between the cover plate 22 and the right longitudinal member 10 and a left support member 27 extends along the length of the left side 21 of the frame M between the cover plate 22 and the left longitudinal member 11. At the front end N of the combine, a right header member 28 extends outwardly from the right side 20 of the frame M between the right side 20 and a right header fender 30. Similarly, a left header member 29 extends outwardly from the left side 21 of the frame M and a left header fender 31.

The header fenders 30 and 31 extend parallel to each other beyond the sides 20 and 21 in the direction of motion of the combine as it is moved over windrows of peanut vines and the header members 28 and 29 serve to space the header fenders 30 and 31 a greater distance apart than the side 20 and 21. It is with the support members 26 and 27, the sides 20 and 21, the header fenders 30 and 31, and the cover plate 22 that the sections A, B, C, D, E, F and G are positioned and it is these sections A, B. C, D, E, F and G of the combine which cooperate to pick up wide windrows of peanut vines, to feed the windrows with reduced widths, to pick the peanuts from the peanut vines, to separate the picked peanuts from the peanut vines, to clean the picked peanuts of dirt and other debris, and to cut the stems from the picked peanuts.

PICKUP SECTION

The pickup section A of the combine of the invention is positioned at the front end N of the combine between the right header fender 30 and the left header fender 31. When the combine is being moved over a windrow of peanut vines, the lower edges 33 of the header fenders 30 and 31 are just above the terrain over which the combine is moving and the distance between the header fenders 30 and 31 insures that the header fenders 30 and 31 are on opposite sides of even relatively wide windrows of peanuts. Thus, the pickup section A extending between the header fenders 30 and 31 and picks up a windrow of peanut vines even though the distance between the sides 20 and 21 of the frame M is not as great as the width of the windrow. This arrangement of the header fenders 30 and 31 and the pickup section A avoids the expense and excess weight which would result from making the entire combine as wide as relatively wide windrows of peanut vines.

The pickup section A of the combine comprises a pickup drum 32 mounted within a plurality of bands 58. The pickup drum 32 has a drive shaft 34 mounted in known manner for rotational motion between the right header fender 30 and the left header fender 31, a right spider member 35 fixedly mounted on the drive shaft 34 adjacent to the right header fender 30, a left spider member 36 fixedly mounted on the drive shaft 34 adjacent to the left header fender 31, and a plurality of finger shafts 37 extending between the right spider member 35 and the left spider member 36. Each spider member 35 or 36 is positioned on the drive shaft 34 by extending a lock bolt 38 through a hub 39 to engage the drive shaft 34 and each spider member 35 or 36 has four arms 40 of equal length spaced ninety degrees apart around the circumference of the hub 39.

Each of the arms 40 of each of the spider members 35 or 36 has a sleeve 41 at its outermost end and it is by extending a finger shaft 37 through a sleeve 41 of the right spider member 35 and a corresponding sleeve 41 of the left spider member 36 that the finger shafts 37 are mounted between the spider members 35 and 36. In the specific embodiment of the invention described herein, there are four finger shafts 37 and the rotational position of the right spider member 35 with respect to the left spider member 36 about the drive shaft 34 is selected to place the centerlines of the four finger shafts 37 parallel to each other and parallel to the centerline of the drive shaft 34.

Each of the finger shafts 37 is freely rotatable within the sleeves 41 in which it is mounted and each of the finger shafts 37 carries a plurality of spring finger clamps 42. Each of the spring finger clamp 42 is a substantially U-shaped plate with its ends bolted to opposite sides of a finger shaft 37 by an attaching bolt 43 which extends through the ends of the clamp 42 and the finger shaft 37. Each clamp 42 has a base portion 44 at that location most remote from the finger shaft 37 to which is used to position a spring finger assembly 45 in each clamp 42.

Each spring finger assembly 45 is a continuous rod of resilient material formed into two parallel spring fingers 46 joined by spring segments 47 on opposite sides of a clip segment 48. The spring segments 47 are coils of the resilient rod and the spring segments 47 are inserted under the clamp 42. The clip segment 48 of a spring finger assembly 45 is fixedly held within each of the plurality of clamps 42 by extending a clip bolt 49 through the clamp base portion 44 and the clip segment 48. When a spring finger assembly 45 is positioned within each of the clamps 42 in this manner, the spring segments 47 of each spring finger assembly 45 are on opposite sides of a clip 44 within a clamp 42 and the spring fingers 46 extend away from the finger shaft 37 on opposides of the clamp 42.

On each finger shaft 37 the clamps 42 are placed along the length of the finger shaft 37 and in those rotational positions on the finger shaft 37 which cause the spring fingers 46 on each finger shaft 37 to be parallel to each other and equally spaced along the length of the finger shaft 37. The result of this arrangement is that each finger shaft 37 carries a plurality of parallel equally spaced spring fingers 46 extending in the same direction. The direction in which the spring fingers 46 carried by a particular finger shaft 37 extend will depend upon the rotational position of the finger shaft 37 within the sleeves 41 in which the finger shaft 37 is mounted.

Each finger shaft 37 has an actuator arm hub 50 mounted on its extending end adjacent to the right header fender 30 by a lock bolt 51. Each actuator arm hub 50 is continuous with a cam arm 52 which carries in known manner a cam follower 53 at its extending end. Motion of each of the cam arms 52 causes rotational motion of the finger shaft 37 on which is mounted and this in turn, varies the direction in which the spring fingers 46 carried by that finger shaft 37 extend. The cam arms 52 are moved by placing the cam follower 53 at the end of each cam arm 52 in a camming channel 54 formed in a cam member 56 fixedly mounted on the right header fender 30 between the hight header fender 30 and the cam arms 52 mounted on the plurality of finger shafts 37.

The shape of the camming channel 54 is selected to rotate each finger shaft 37 in a counterclockwise direction as viewed in FIG. 2 as the finger shafts 37 are moved in a counterclockwise direction with counterclockwise rotation of the drive shaft 34 as viewed in FIG. 2. Counterclockwise rotation in FIG. 2 is clockwise in FIGS. 5 and 6 because of differences in the manner in which the pickup section A is viewed and the specific shape of the camming channel 54 is best understood by considering the camming channel 54 as seen in FIG. 6 and as comprising four segments S-1, S-2, S-3 and S-4. The first segment S-1 of the camming channel 54 is traversed by a cam follower 53 as a finger shaft 37 is caried to a position P-2 in a horizontal plane of the drive shaft 34 from a position P-1 adjacent to the lower edges 33 of the header fenders 30 and 31 with clockwise rotation of the drive shaft 34 as viewed in FIG. 5. The second segment S-2 of the camming channel 54 is traversed by a cam follower 53 as a finger shaft 37 is carried from the position P-2 to a position P-3 directly above the position P-1 with clockwise rotation of the drive shaft 34 as viewed in FIG. 5. The third segment S-3 of the camming channel 54 is traversed by a cam follower 53 as a finger shaft 37 is carried from the position P-3 to a position P-4 on the opposite side of the drive shaft 34 from the position P-2 with clockwise rotation of the drive shaft 34 as viewed in FIG. 5. The fourth segment S-4 of the camming channel 54 is traversed by a cam follower 53 as a finger shaft 37 is carried from the position P-4 to the position P-1 with clockwise rotation of the drive shaft 34 as viewed in FIG. 5.

The first segment S-1 is shaped to rotate a finger shaft 37 ninety degrees in a clockwise direction as viewed in FIG. 6 as the cam follower 53 mounted on the finger shaft 37 traverses the first segment S-1 with clockwise rotation of the drive shaft 34, the second segment S-2 is shaped to rotate a finger shaft 37 ninety degrees in a clockwise direction as viewed in FIG. 6 as the cam follower 53 mounted on the finger shaft 37 traverses the second segment S-2 with clockwise rotation of the drive shaft 34, the third segment S-3 is shaped to cause substantially no rotational motion of a finger shaft 37 as the cam follower 53 mounted on the finger shaft 37 traverses the third segment S-3 with clockwise rotation of the drive shaft 34, and the fourth segment S-4 is shaped to rotate a finger shaft 37 one hundred and eighty degrees in a clockwise direction as viewed in FIG. 6 as the cam follower 53 mounted on the finger shaft 37 traverses the fourth segment S-4 with clockwise rotation of the drive shaft 34. The required shapes of the segments S-1, S-2, S-3 and S-4 are selected using known techniques and methods.

The shapes of the segments S-1, S-2 and S-4 are also similarly selected so that the rotation of the finger shaft 37 as it is moved between the positions P-1, P-2, P-3 and P-4 is uniformly accelerated to and from a maximum rotational speed. The maximum rotational speed of a finger shaft 37 is attained when the finger shaft 37 is approximately halfway between the positions P-1, P-2, P-3 and P-4 and is sufficiently great relative to the rotational speed of the drive shaft 34 to obtain the above described rotation of the finger shaft 37 between the positions P-1, P-2, P-3 and P-4.

The finger shafts 37 are positioned within the hubs 50 so that when a finger shaft 37 is in the position P-1, the spring fingers 46 extend from the clamps 42 on the finger shaft 37 downward between and below the header fenders 30 and 31. As a finger shaft 37 is moved from position P-1 to position P-2, the finger shafts 37 are rotated upward in a clockwise direction as viewed in FIG. 5 so that the spring fingers 46 extend away from the rear end R in a substantially horizontal plane when the spring shaft 37 is in position P-2. As a finger shaft 37 is moved from position P-2 to position P-3, the spring fingers 46 on the finger shaft 37 are rotated upward in a clockwise direction as viewed in FIG. 5 so as to extend upward when the finger shaft 37 is in position P-3. The spring fingers 46 remain in this upward position as the finger shaft 37 moves from position P-3 to position P-4 and as the finger shaft 37 moves from position P-4 to position P-1 the spring fingers 46 are rotated in a clockwise direction as viewed in FIG. 5 from this upward extending position into that position in which they extend downward between and below the header fenders 30 and 31.

The result of the motion of the spring fingers 46 as the finger shafts 37 move between position P-1 and position P-2 is that with motion of the combine along a windrow of peanut vines, the peanut vines carrying peanuts are engaged by spring fingers 46 as they rotate with the rotation of a finger shaft 37 and as they move upward with upward motion of the finger shaft 37. This combined rotational and upward motion of the spring fingers 46 as the finger shafts 37 move between position P-1 and position P-2 causes the peanut vines to be firmly grasped as they lie upon the ground and to be firmly held as they are carried upward. The upward rotation of the spring fingers 46 as the spring shafts 37 move from position P-2 to position P-3 insures that the peanut vines continue to be firmly held by the spring fingers 46 until the peanut vines are carried over the drive shaft 34.

The uniform acceleration to and deceleration from a maximum rotational speed which each finger shaft 37 experiences between positions P-1 and P-2, and P-2 and P-3, and P-4 and P-1 and the corresponding motion of the tips of the spring fingers 46 as they engage peanut vines and move peanut vines upward has been found to improve the pickup characteristics of the pickup section A of the combine and to eliminate substantially all objectionable vibration as the peanut vines are picked from the ground and carried upward. The spring segments 47 provide a degree of resiliency to each spring finger 46 which permits a spring finger 46 to strike a stone or other hard object without breaking and to return to normal position after striking the object.

Just above the lower edges 33 of the header fenders 30 and 31 and to the rear of the drive shaft 34 is a transverse support member 57. The transverse support member 57 is fixedly extends between the right header fender 30 and the left header fender 31 parallel to the drive shaft 34. A plurality of bands 58 extend from the transverse member 57 beneath the drive shaft 34 upward and over the drive shaft 34 and the finger shafts 37 to support member 57' to provide a shell within which the drive shaft 34 and the finger shafts 37 move with rotation of the drive shaft 34. The bands 58 extend parallel to the header fenders 30 and 31 and to each other from along the length of the transverse member 57 so that there is a band 58 between each pair of adjacent spring fingers 46 carried by the finger shafts 37 as the finger shafts 37 move from position P-1 to position P-3. Thus, the spring fingers 46 extend between adjacent bands 58 and the peanut vines engaged and carried by the spring fingers 46 as the finger shafts 37 move from position P-1 to the position P-3 are carried along a surface formed by the bands 58.

After passing over the drive shaft 34 the bands 58 extend in a substantially horizontal direction toward the rear end R of the frame M. Thus, when the spring fingers 46 move downward with substantially no rotation of the finger shafts 37 as the finger shafts 37 move from position P-3 to position P-4, the spring fingers 46 disappear between the bands 58 and the peanut vines carried by the spring fingers 46 to above the position P-3 on the bands 58 are released by the spring fingers 46. It is when the peanut vines picked up and carried upward by the pickup section A of the combine are in this position that the peanut vines are engaged by the feeder section B of the combine.

FEEDER SECTION

After the bands 58 pass over the drive shaft 34 in the pickup section A of the combine and extend a short distance toward the rear end R of the frame M, the bands 58 terminate on a transverse member 57'. The transverse member 57' is fixedly positioned between the right header fender 30 and the left header fender 31 of the frame M above the transverse member 57 and the bands 58 serve to provide a continuous surface from the transverse member 57, around and over the drive shaft 34 and the finger shafts 37, and extending to the transverse member 57'. The feeder section B of the combine comprises a solid arcuate floor 58' which curves upward to a transverse member 60 from the transverse member 57' and a feeder drum 61 positioned between the header fenders 30 and 31 over the floor 58' as it curves upward to the transverse member 60.

The feeder drum 61 comprises a substantially solid cylindrical wall 62 closed at that end adjacent the right header fender 30 by a right circular disc 63 and closed at that end adjacent the left header fender 31 by a left circular disc 64. A sleeve 65 extends from the right circular disc 63 toward the right header fender 30 and a sleeve 66 extends from the left circular disc 64 toward the left header fender 31. The extending end of the sleeve 65 is rotatably mounted in the right header fender 30 and the extending end of a like sleeve (not shown) is rotatably mounted in the left header fender 31 and the centerlines of the sleeves 65 and 66 coincide with each other and with the centerline of the cylindrical wall 62. The centerline of the cylindrical surface 62 is parallel to the centerline of the drive shaft 34 and substantially coincides with the center of curvature of the floor 58' as it curves upward to the transverse member 60. The sleeves are rotatably mounted in the header fenders 30 and 31 in those positions which place the cylindrical wall 62 over and adjacent to the floor 58' as the floor 58' curves upward to the transverse member 60.

A right stationary shaft 67 extends through the sleeve 65, beyond the right circular disc 63 and into the interior of the feeder drum 61 and a left stationary shaft 68 extends through the sleeve 66, beyond the left circular disc 64 and into the interior of the feeder drum 61. The outer ends of the stationary shafts 67 and 68 are fixedly attached to the header fenders 30 and 31 respectively by positioning members 69. This arrangement permits the sleeves 65 and 66 and the cylindrical wall 62 of the feeder drum 61 to be rotatable above the floor 58' while the stationary shafts 67 and 68 remain stationary.

A right rod arm 70 is fixedly attached to that end of the right stationary shaft 67 within the feeder drum 61 adjacent to the right circular disc 63 and a left rod arm 71 is fixedly attached to that end of the left stationary shaft 68 within the feeder drum 61 adjacent to the left circular disc 64. A rod shaft 72 rotatably extends between the right rod arm 70 and the left rod arm 71 with its centerline parallel to the axis of rotation of the feeder drum 61. The stationary shafts 67 and 68 and the rod arms 70 and 71 serv to fixedly position the axis of rotation of the rod shaft 72 within the feeder drum 61 with the axis of rotation of the rod shaft 72 offset or displaced from the axis of rotation of the cylindrical wall 62.

Fixedly mounted along the length of the rod shaft 72 are a plurality of rod hubs 73. A plurality of rods 74 are pivotally attached at one end to each of the plurality of rod hubs 73. The plurality of rods 74 are of equal length and each rod 74 extends radially through an aperture 75 in the cylindrical surface 62 of the feeder drum 61. It will be understood that as the cylindrical wall 62 and the sleeves 65 and 66 rotate, the axis of rotation of the rod shaft 72 remains stationary relative to the motion of the cylindrical wall 62 and the rod shaft 72 and rods 74 rotate about the axis of rotation of the rod shaft 72.

The length of the rods 74 is selected so that when the aperture 75 through which a rod 74 extends is on the opposite side of the axis of rotation of the cylindrical wall 62 from the rod shaft 72, the extending end of the rod 74 is substantially flush with the cylindrical surface 62. When the aperture 75 through which a rod 74 extends is on the opposite side of the rod shaft 72 from the axis of rotation of the cylindrical wall 62, this length of the rods 74 causes the rod 74 to extend beyond the cylindrical wall 62 a distance equal to twice the distance by which the axis of rotation of the rod shaft 72 is offset or displaced from the axis of rotation of the cylindrical wall 62. Between these two aperture positions, a rod 74 extends through an aperture 75 beyond the cylindrical wall 62 for increasing and decreasing distances depending upon the position of the aperture 75 relative to the aperture positions of maximum rod 74 extension and minimum rod 74 extension. Thus, the arrangement described provides a rotating cylindrical surface 62 with rods 74 moving with the cylindrical wall 62 and extending varying distances beyond the cylindrical wall 62.

The motion of a rod 74 as the extent to which it extends through an aperture 75 varies causes the angle at which the rod 74 extends through the aperture 75 to vary and the apertures 75 are large enough to permit a rod 74 to extend through an aperture 75 at various angles without binding. A sealing ring 76 surrounds each rod 74 and is positioned adjacent to the aperture 75 through which the rod 74 extends. The plurality of sealing rings 76 close the apertures 75 around the rods 74 and prevent material from falling into the interior of the feeder drum 61 while permitting the angles at which the rods 74 extend through the apertures 75 to vary. The sealing rings 76 are fixedly positioned adjacent to the apertures 75 by an inner shell 76a within and coextensive with the cylindrical wall 62 of the feeder drum 61.

Fixedly mounted on the cylindrical wall 62 of the feeder drum 61 adjacent to the right header fender 30 is a right helical wall 77 and fixedly mounted on the cylindrical wall 62 adjacent to the left header fender 31 is a left helical wall 78. When the helical walls 77 and 78 are considered as though viewed in FIG. 2, the right helical wall 77 spirals in counterclockwise direction from that end of the cylindrical wall 62 adjacent to the right header fender 30 toward the left header fender 31 and the left helical wall 78 spirals in a counterclockwise direction from that end of the cylindrical wall 62 adjacent to the left header fender 31 toward the right header fender 30. As the helical walls 77 and 78 spiral the distance between the helical walls 77 and 78 as measured parallel to the centerline of the cylindrical wall 62 varies from approximately the distance between the header fenders 30 and 31 to approximately the distance between the sides 20 and 21 of the frame M. The result of this arrangement of the helical walls 77 and 78 is that as the feeder drum 61 rotates in a clockwise direction as viewed in FIG. 2, peanut vines between the helical walls 77 and 78 are forced away from the ends of the cylindrical wall 62 toward the middle of the cylindrical wall 62.

The rod arms 70 and 71 are positioned on the stationary shafts 67 and 68 so as to extend forward and toward a position over the pickup section A of the combine. This causes the rods 74 to extend from the cylindrical wall 62 to the maximum extent as they pass with the cylindrical wall 62 over that portion of the floor 58' to which the peanut vines are delivered by the spring fingers 46. Thus, the rods 74 serve to engage the peanut vines and pull the peanut vines between the cylindrical wall 62 and the floor 58' as the floor 58' curves upward to the transverse member 60. When the rods 74 and the peanut vines engaged by the rods 74 reach a position above the transverse member 60, the rods 74 are withdrawn into the apertures 75 and the peanut vines are no longer engaged by the rods 74.

The apertures 75 through which the rods 74 extend are circumferentially and axially spaced in a substantially uniform manner about the cylindrical wall 62 and are positioned relative to the helical walls 77 and 78 to place the greatest number of apertures 75 between the helical walls 77 and 78 where the distance between the helical walls 77 and 78 is greatest and to reduce the number of apertures 75 between the helical walls 77 and 78 as the distance between the helical walls 77 and 78 decreases. This rod 74 arrangement permits the rods 74 to engage a wide mass of peanut vines as it is released by the spring fingers 46 and to cooperate with the helical walls 77 and 78 in delivering the mass of peanut vines to the transverse member 60 with reduced width. Thus, the feeder section B serves to reduce the width of a windrow of peanut vines picked up by the pickup section A to the width of the picking section C and in so doing eliminates the necessity for the combine as a whole to be as wide as the windrows of peanut vines.

PICKING SECTION

The picking section C of the combine of the invention comprises three picking cylinders 80, 81 and 82. The picking cylinder 80 is adjacent to the feeder drum 61 and it is the picking fingers 83 of the picking cylinder 80 which engage the peanut vines with peanuts attached which are delivered to a position above the transverse member 60 by the feeder drum 61. The picking cylinders 80, 81 and 82 are substantially identical and only the picking cylinder 80 will be described below. However, prime and double prime reference numbers are used in the figures on the picking cylinders 81 and 82 respectively to clearly indicate some of the parts of these picking cylinders 81 and 82 which correspond to the parts of the picking cylinder 80 described.

The picking cylinder 80 comprises an axle 84 mounted for rotational motion between the right side 20 and the left side 21 of the frame M using a bracket 401 positioned on the right support member 26 and a bracket 402 positioned on the left support member 27. Fixedly positioned on the axle 84 adjacent to the right side 20 of the frame M is a circular plate 85 and fixedly positioned on the axle 84 adjacent to the left side 21 of the frame M is a left circular plate 86. The right circular plate 85 has a plurality of notches 87 equidistantly distributed along its circumference and the left circular plate 86 has a plurality of notches 88 equidistantly distributed along its circumference. Positioned in and extending between each of the plurality of notches 87 and one of the plurality of notches 88 is a finger support 89. There are a plurality of finger supports 89 and the notches 87 and 88 are positioned in the circular plates 85 and 86 so that the finger supports 89 extend between the notches 87 in the right circular disc 85 and the notches 88 in the left circular disc 86 parallel to each other and to the centerline of the axle 84. Thus, the circular plates 85 and 86 and the plurality of finger supports 89 resemble a cylindrical cage. Bolts 99 extending through the finger supports 89 into the circular plates 85 and 86 fixedly position the finger supports 89 in the notches 87 and 88.

Positioned along the length of each finger support 89 are a plurality of spring finger assemblies 90. The spring finger assemblies 90 resemble the spring finger assemblies 45 of the pickup section A previously described and each spring finger assembly 90 is a rod of resilient material bent to form two picking fingers 83 joined by two spring segments 47 and a clip segment 48. The plurality of spring finger assemblies 90 are mounted on each of the finger supports 89 by inserting a finger support 89 through the spring segments 47 of each of the plurality of spring finger assemblies 90 and by fixedly placing the clip segment 48 of each spring finger assembly 90 under one of a plurality of clips 91 mounted on the finger support 89.

The spring finger assemblies 90 are positioned on a finger support 89 so that the picking fingers 83 extend radially outward and so that the two picking fingers 83 of each spring finger assembly 90 and adjacent picking fingers 83 of adjacent spring finger assemblies 90 are uniformly distributed along the length of the finger support 89 between the circular plates 85 and 86. Thus, as the picking cylinder 80 is rotated about the axis of rotation of the axle 84 in a clockwise direction as viewed in FIG. 2, a plurality of rows of picking fingers 83 move over the transverse support member 60 and downward toward the peanut vines being carried upward by the feeder drum 61.

The picking fingers 83 of the picking cylinder 80 pass between the helical walls 77 and 78 of the feeder drum 61 and do not strike the rods 74 of the feeder drum 61 because the rods 74 of the feeder drum 61 are withdrawn into the cylindrical surface 62 of the feeder drum 61 as the rods 74 move upward between the feeder drum 61 and the picking cylinder 80 with clockwise rotation of the feeder drum 61 as viewed in FIG. 2. The withdrawing of the rods 74 as the rods 74 move upward above the transverse member 60 and the downward motion of the picking fingers 83 of the picking cylinder 80 toward the transverse member 60 insure that peanut vines are transferred from the feeder section B to the picking section C of the combine.

Beneath the picking cylinders 80 and 81 is a breastplate 91 and beneath the picking cylinder 82 is a discharge screen 94. The breastplate 91 comprises two arcuate segments 92 and 93 and the discharge screen 94 is an arcuate segment formed of longitudinal rods 94a and transverse rods 94b. The breastplate 91 and the discharge screen 94 form a continuous surface of arcuate segments which is inclined upward from the transverse member 60 to a transverse member 95 extending between the right side 20 and the left side 21 of the frame M. The breastplate 91 is supported between the transverse member 60 and a transverse member 97 at the ridge between the arcuate segment 92 and the arcuate segment 93 by a transverse member 96 extending between the right side 20 and the left side 21 of the frame M and the discharge screen 94 extends from the transverse member 97 to the transverse member 95.

The center of curvature of the arcuate segment 92 of the breastplate 91 coincides with the axis of rotation of the picking cylinder 80, the center of curvature of the arcuate segment 93 of the breastplate 91 coincides with the axis of rotation of the picking cylinder 81, and the center of curvature of the discharge screen 94 of the breastplate 91 coincides with the axis of rotation of the picking cylinder 82. The axles 84, 84' and 84" of the picking cylinders 80, 81 and 82 respectively are positioned between the sides 20 and 21 of the frame M and the length of the picking fingers 83, 83' and 83" are selected so that as the picking cylinders 80, 81, and 82 rotate in a clockwise direction as viewed in FIG. 2, the picking fingers 83 of the picking cylinder 80 pass just above the arcuate segment 92 of the breastplate 91, the picking fingers 83' of the picking cylinder 81 pass just above the arcuate segment 93 of the breastplate 91, and the picking fingers 83" of the picking cylinder 82 pass just above the discharge screen 94.

The picking fingers 83' of the picking cylinder 81 are laterally displaced with respect to the picking fingers 83 of the picking cylinder 80 so that in the space between the picking cylinders 80 and 81, the picking fingers 83' of the picking cylinder 81 pass between the picking fingers 83 of the picking cylinder 80. Similarly, the picking fingers 83" of the picking cylinder 82 are laterally displaced with respect to the picking fingers 83' of the picking cylinder 81 so that in the space between the picking cylinders 81 and 82 the picking fingers 82" of the picking cylinder 82 pass between the picking fingers 83' of the picking cylinder 81.

Thus, with clockwise rotation of the picking cylinders 80, 81 and 82 as viewed in FIG. 2, peanut vines engaged by the picking fingers 83 of the picking cylinder 80 are carried by these picking fingers 83 along the arcuate segment 92 to a position over the transverse member 96. As the peanut vines move upward above the transverse member 96 with the picking fingers 83 of the picking cylinder 80, the peanut vines are engaged by the picking fingers 83' of the picking cylinder 81 moving downward. The downward motion of the picking fingers 83' pulls the peanut vines from the picking fingers 83 and the picking fingers 83' of the picking cylinder 81 carry the peanut vines along the arcuate segment 93 toward the transverse member 97. As the peanut vines move upward above the transverse member 97 with the picking fingers 83' of the picking cylinder 81, the peanut vines are engaged by the picking fingers 83" of the picking cylinder 82 moving downward. The picking fingers 83" of the picking cylinder 82 pull the peanut vines from the picking fingers 83' and carry the peanut vines along the discharge screen 94 toward the transverse member 95.

The opposing motions of the picking fingers 83 and the picking fingers 83' and the opposing motions of the picking fingers 83" and the picking fingers 83' serve to snap and break peanuts from the peanut vines. These opposing motions also serve to knock dirt and other debris from the peanut vines and the peanuts. The breastplate 91 has a plurality of apertures 98 in its surface and it is through these apertures 98 that dirt and other debris falls to pass between the sides 20 and 21 of the frame M to the ground. The aperatures 98 are too small for the peanuts and vines to pass through the breastplate 91 and the peanuts and vines move as a mass along the arcuate segments 92 and 93 to the discharge screen 94. The rods 94a and 94b of the discharge screen 94 are spaced sufficiently far apart for peanuts picked from the peanut vines to pass through the discharge screen 94. The result is that initial separating action to separate peanuts from peanut vines is provided in the picking section C of the combine.

A plurality of spring shafts 105 extend between the sides 20 and 21 of the frame M beneath the arcuate segments 92, 93 and 94 of the breastplate 91 and the discharge screen 94. Each of the plurality of spring shafts 105 has a plurality of spring finger assemblies 106 distributed along its length with the picking fingers 107 of the spring finger assemblies 106 extending upward through some of the apertures 98 in the breastplate 91 and through some of the spaces in the discharge screen 94 between rods 94a and 94b. The spring finger assemblies 106 are identical to the spring finger asemblies 90 and are fixedly positioned on the spring shafts 105 in the same manner as the spring finger assemblies 90 are fixedly positioned on the spring supports 89 of the picking cylinders 80, 81 and 82.

The picking fingers 83, 83' and 83" of the picking cylinders 80, 81 and 82 pass between the picking fingers 107 extending upward through the breastplate 91 and the discharge screen 94 as the picking cylinders 80, 81 and 82 rotate and the retarding of peanut vine motion by the picking fingers 107 as the peanut vines are carried by the picking fingers 83, 83' and 83" along the arcuate segments 92 and 93 and the discharge screen 94 aids in breaking and snapping peanuts from peanut vines. The result of this arrangement is that peanuts carried along the breastplate 91 and the discharge screen 94 by the picking cylinders 80, 81 and 82 are snapped and broken from the peanut vines and when the peanut vines and peanuts reach a position at the end of the discharge screen adjacent to the transverse member 95, substantially all of the peanuts have been broken and snapped from the peanut vines and many have fallen through the discharge screen 94. It is this mass of peanut vines mixed with the remaining peanuts picked from the peanut vines which is engaged by the transfer section D of the combine and passed by the transfer section D to the separating section E.

TRANSFER SECTION

The transfer section D of the combine comprises the transfer drum 100 and the discharge screen 94 extended from the transverse member 95 to a transverse member 95' as a downwardly inclined substantially flat segment. The transfer drum 100 is identical in construction to the picking cylinders 80, 81 and 82 with the exception that the diameter of the transfer drum 100 as measured from picking finger 112 tip to picking finger 112 tip is substantially less than the diameter of the picking cylinders 80, 81 and 82. Thus, the transfer drum 100 has an axle 101 mounted for rotational motion between the sides 20 and 21 of the frame M using brackets 403 attached to the support members 26 and 27, a right circular plate 102, a left circular plate 103, and a plurality of finger supports 104 extending parallel to each other and to the centerline of the axle 101 between notches 110 in the right circular plate 102 and notches 111 in the left circular plate 103.

The picking fingers 112 of the transfer drum 100 are mounted on the finger supports 104 of the transfer drum 100 in the same manner as the picking fingers 83 are mounted on the finger supports 89 of the picking cylinder 80. The picking fingers 112 of the transfer drum 100 are laterally displaced with respect to the picking fingers 83" of the picking cylinder 82 and when the transfer drum 100 is rotated in a clockwise direction as viewed in FIG. 2, the picking fingers 112 of the transfer drum 100 pass between the picking fingers 83" of the picking cylinder 82. Thus, as a mass of peanut vines mixed with peanuts is carried upward beyond the transverse member 95 by the picking fingers 83" of the picking cylinder 82, the mass of peanut vines and peanuts is engaged by the picking fingers 112 of the transfer drum 100 and carried downward along the discharge screen 94 to a position on a separating screen 120 continuous with the discharge screen at the transverse member 95'.

The transverse drum 100 rotates at a high velocity relative to the picking cylinders 80, 81 and 82 and serves to remove the mass of peanut vines mixed with peanuts from the last picking cylinder 82 of the picking section C of the combine and to transfer the mass from the upward inclining breastplate 91 to the separating screen 120. The curved arcuate segments 92 and 93 and the arcuate portion of the discharge screen 94 tend to cause a portion of each mass of peanut vines and peanuts to travel a complete revolution with the picking cylinders 80, 81 and 82. This tends to improve the picking action of the picking section C but would cause relatively poor movement of the mass of peanut vines and peanuts from the picking section C to the separating section E. Since the downward slope of the discharge screen 94 beneath the transfer drum 100 causes the transfer drum 100 to release substantially all peanut vines and peanuts after they have passed beneath the transfer drum 100 and since the high relative velocity of the transfer drum 100 causes a mass of peanut vines and peanuts carried by the picking cylinder 82 to be frequently engaged by picking fingers 112, the transfer drum 100 provides means for permitting this extra picking action in the picking section C of the combine while insuring that the peanut vines and peanuts are all efficiently transferred to the separating section E.

The small diameter of the transfer drum 100 permits this transfer of peanut vines and peanuts to be accomplished without increasing the height of the combine beyond that necessary for the picking section C and the separating section E. In addition, the opposing motions of the picking fingers 83″ of the picking cylinder 82 and the picking fingers 112 of the transfer drum 100 provide additional picking action which further insures that all peanuts are picked from the peanut vines. The discharge screen 94 beneath the transfer drum 100 provides additional initial separating action to separate picked peanuts from the peanut vines before the mass of picked peanuts and peanut vines reaches the separating section E.

SEPARATING SECTION

The separating section E of the combine comprises a plurality of paddles 121 having a plurality of rake fingers 122 extending from their outer edges and rotating above the separating screen 120. The separating screen 120 extends from the transverse member 95′ at the end of the transfer section D to the rear end R of the frame M.

The separating screen 120 comprises four rod assemblies 123, 124, 125 and 126. The rod assemblies 123, 124, 125 and 126 are substantially identical in construction and only the rod assembly 124 will be described in detail. The rod assembly 124 has a front angle member 127, a rear support member 128, a plurality of intermediate support members 129, and a plurality of curved rods 130 extending through the support members 127, 128 and 129. The support members 127, 128 and 129 are identical and in cross section resemble a right angle having a substantially horizontal side 138 and a substantially vertical side 139.

The support members 127, 128 and 129 extend parallel to each other and to the axle 101 of the transfer drum 100 between a frame plate 116 positioned adjacent to the right side 20 of the frame M and a frame plate 118 positioned adjacent to the left side 21 of the frame M. The plates 116 and 118 are supported by bearing blocks 117 attached to the sides 20 and 21. The frame plates 116 and 118 are slidably movable on the bearing blocks 117 in a horizontal plane and this permits the separating screen 120 to be removed from the frame M through an opening 160 in the rear end R of the combine when cleaning, repairing, or changing of the separating screen 120 is required.

Each of the plurality of curved rods 130 is formed into an attaching means 141 at one end and each of the curved rods 130 is inserted through holes 141′ in the vertical sides 139 of the angle members 127, 128, and 129. When the plurality of curved rods 130 are positioned in the angle members 127, 128, and 129 in this manner, the attaching means 141 of each curved rod 130 is against the outer surface of the vertical side 139 of the front channel member 127 and the extending end of each curved rod 130 is beneath the horizontal side 138 of the rear channel member 128.

The attaching means 141 are maintained in this position against the vertical side 139 of the front angle member 127 by extending a keeper block 143 of wood or similar material between the frame plates 116 and 118 with one side of the keeper block 143 engaging the attaching means 141 of the curved rods 130. When the vine rack 120 is removed from the combine as described above, this arrangement for positioning the curved rods 130 permits a broken or damaged curved rod 130 to be replaced by simply removing the keeper block 143, withdrawing the broken curved rod 130, inserting a new curved rod 130, and replacing the keeper block 143. It also permits the opening or space between adjacent curved rods 130 to be adjusted to peanuts and the like having various sizes by simply removing or adding curved rods 130.

The curved rods 130 extend through the angle members 127, 128 and 129 parallel to each other and are spaced apart, as described above, by a distance which is large enough for peanuts to drop between adjacent curved rods 130, but which is too small for peanut vines to readily drop between the adjacent curved rods 130. The rod assemblies 124 and 125 define a surface which is substantially the arc of a circle and the rod assembly 123 differs from the rod assemblies 124 and 125 in that it is distorted from an arc of a circle to be continuous with the discharge screen 94 at the transverse member 95′. The rod assembly 126 differs from the rod assemblies 124 and 125 in that the arc of a circle defined by it is foreshortened to provide for the discharge of peanut vines from the rear end R of the combine through the opening 160. A shroud 600 covers the opening 160 to direct the discharged peanut vines downward.

Above the rod assembly 123 is a paddle assembly 145, above the rod assembly 124 is a paddle assembly 146, above the rod assembly 125 is a paddle assembly 147, and above the rod assembly 126 is a paddle assembly 148. The paddle assemblies 145, 146, 147 and 148 are substantially identical and only the paddle assembly 145 will be described. The paddle assembly 145 comprises a paddle shaft 149 mounted between the sides 20 and 21 of the frame M for rotational motion using bearings 406 attached to the support members 26 and 27, a right paddle spider 150 fixedly mounted on the paddle shaft 149 adjacent the right side 20 of the frame M, a left paddle spider 151 fixedly mounted on the paddle shaft 149 adjacent to the left side 21 of the frame M, and a pair of paddles 121 extending between the paddle spiders 150 and 151 on opposite sides of the paddle shaft 149. Each paddle spider 150 or 151 has a hub 152, a first arm 153 extending radially from the hub 152, and a second arm 154 extending radially from the hub 152 in the opposite direction from the first arm 153.

The paddles 121 are substantially rectangular sheets of sheet metal or similar material and one edge of a paddle 121 is attached by bolts 155 or other known means to the first arm 153 of the right paddle spider 150 and the other edge of the paddle 121 is attached by bolts 155 or other known means to the first arm 153 of the left paddle spider 151. Similarly, the second paddle 121 of the paddle assembly is attached between the second arm 154 of the right paddle spider 150 and the second arm 154 of the left paddle spider 151. A third paddle spider (not shown) may be used between the paddle spiders 150 and 151 to provide increased support to the paddles 121.

The paddles 121 extend radially beyond the arms 153 and 154 of the paddle spiders 150 and 151 and are curved to form substantially U-shaped channels 156. It is from within the U-shaped channels 156 that the rake fingers 122 extend. The rake fingers 122 are of resilient material and are similar to the spring fingers 46 in that they are the extending ends of rake finger assemblies 158 similar to a spring finger assembly 45. The spring segments 47 of each of the plurality of rake finger assemblies 158 are positioned within the U-shaped channels 156 with the clip segment 48 of each of the plurality of rake finger assemblies 158 being fixedly held by insertion under a clip 159 and by a bolt 160 which presses the clip 159 toward the paddle 121. This arrangement permits rake finger assemblies 158 to be easily replaced when a rake finger 122 is broken or otherwise damaged.

The rake fingers 122 extend outward beyond the paddles 121 through apertures 157 in the paddles 121 at an angle to a radius of the paddle assembly 145 and have tips 142 parallel to the radius. The rake finger assemblies 158 are distributed along the length of each U-shaped channel 156 so that the extending rake fingers 122 are uniformly spaced along the width of the paddles 121. Thus, as the paddles 121 are rotated with rotation of the paddle shaft 149 about its axis of rotation, two substantially solid paddles 121 having rake fingers 122 extending outward from their outermost edges are passed repeatedly over the rod assembly 123. The distance between the axis of rotation of the paddle shaft 149 and the tips 142 of the rake fingers 122 is selected to place the tips 142 of the rake fingers 122 just above the rod assembly 123 of the separating screen 120 so that all peanut vines on the rod assembly 123 are engaged and moved by the paddle assembly 145.

The right paddle spider 150 is angularly displaced about the paddle shaft 149 from the left paddle spider 151 by approximately twelve degrees. This angular displacement of the right paddle spider 150 with respect to the left paddle spider 151 causes the paddles 121 to extend at an angle to a line perpendicular to the sides 20 and 21 as they extend between the arms 153 and 154 of the paddle spiders 150 and 151 as best shown in FIGS. 12 and 13. The curving of the paddles 121 is most pronounced at the outer edge where the U-shaped channels 156 are formed and this results in the plurality of rake fingers 122 extending from each paddle 121 being distributed along a line which extends at an angle between the sides 20 and 21 of the frame M.

When the paddle assemblies 145, 146, 147 and 148 are considered as rotating in a clockwise direction as viewed in FIG. 2, the angle at which the rake fingers 122 extend from the paddles 121 causes the tips 142 of the rake fingers 122 to pass over the rod assemblies 123, 124, 125 and 126 behind the paddle 121 from which the rake fingers 122 extend. With clockwise rotation of the paddle assemblies 145, 146, 147 and 148, this retarded positioning of the tips 142 of the rake fingers 122 permits the paddles 121 to engage and move a large mass of peanut vines and peanuts before the rake fingers 122 engage those smaller portions of the large mass of peanut vines and peanuts left behind by the paddle 121.

The curved shape of the paddles 121 causes each paddle 121 to progressively engage a mass of peanut vines and peanuts and it has been found that this arrangement significantly reduces the shock to the paddles 121 resulting from the paddles 121 striking a mass of peanut vines and peanuts. Since the rake fingers 122 also progressively engage the mass of peanut vines and peanuts, since the rake fingers 122 of one paddle assembly 145, 146, 147 or 148 progressively pass between the rake fingers 122 of another paddle assembly 145, 146, 147 or 148 as the mass of peanut vines and peanuts is transferred from one paddle assembly to another, and since the rake fingers 122 are of resilient material, any tendency toward disagreeable and damaging jarring of the combine is substantailly eliminated.

Moreover, the smooth flat surface presented by each of the paddles 121 to a mass of peanut vines and peanuts and the construction of the separating screen 120 prevent the peanut vines from becoming wrapped about the paddles 121 or portions of the separating screen 120, and the rake fingers 122 extending from the paddles 121 serve to insure that all peanut vines are removed along the separating screen 120.

The paddle assemblies 145, 146, 147 and 148 are rotated in a clockwise direction as viewed in FIG. 2 and the paddle assembly 146 is approximately twenty degrees ahead of the paddle assembly 145 in rotational phase, the paddle assembly 147 is approximately twenty degrees ahead of the paddle assembly 146 in rotational phase, and the paddle assembly 148 is approximately twenty degrees ahead of the paddle assembly 147 in rotational phase. This phase relationship between the paddle assemblies 145, 146, 147 and 148 improves the separating action of the separating section E because the phase retarding of the paddle assemblies 146, 147 or 148 to which the peanut vines are transferred by preceding paddle assembly 145, 146, or 147 permits the preceding paddle assembly 145, 146, or 147 to carry the vines upward and to loosen and shake the vines before they are engaged by the succeeding paddle assembly 146, 147 or 148. In addition, it aids in eliminating vibration and shock to the combine as a whole and to the means used to drive the paddle assemblies 145, 146, 147 and 148 since it insures that the mass of peanut vines and peanuts is transferred between only two of paddle assemblies 145, 146, 147 and 148 at a time.

From the foregoing, it will be understood that as the paddle assemblies 145, 146, 147 and 148 are rotated in a clockwise direction as viewed in FIG. 2, the paddle assembly 145 engages a mass of peanut vines and peanuts placed upon the separating screen 120 by the transfer drum 100 and carries the mass of peanut vines and peanuts along the rod assembly 123 to the rod assembly 124 where it is engaged by the paddle assembly 146 and carried along the rod assembly 124 of the vine rack 120 to the rod assembly 125. The mass of peanut vines and peanuts is subsequently moved by the paddle assemblies 147 and 148 along the rod assemblies 125 and 126 to the opening 160 in the rear end R of the frame M. As mass of peanut vines and peanuts is moved along the separating screen 120 by the clockwise rotation of the paddle assemblies 145, 146, 147 and 148 as viewed in FIG. 2, the mass is agitated and rearranged many times and as a result the peanuts picked from the peanut vines in the picking section C of the combine are-separated from the peanut vines and drop between the curved rods 130. Thus, it is only peanut vines and large rocks and other debris which are discharged through the opening 160.

In order to insure that all peanuts are picked and separated from the peanut vines and that no peanuts are discharged from the combine with the peanut vines and debris by the paddle assembly 148, a plurality of pins 161 are extended upward from the horizontal sides 138 of the angle members 129. The pins 161 are distributed along the length of each angle member 129 in positions which cause the rake fingers 122 to pass between adjacent pins 161 as the paddle assemblies 145, 146, 147 and 148 rotate. Thus, as the rake fingers 122 carry peanut vines and peanuts along the seaparting screen 120, the pins 161 retard the motion of the peanut vines and peanuts so as to agitate the peanut vines and peanuts for additional separating action and for picking any peanuts still clinging or otherwise attached to the peanut vines.

The pins 161 and the four paddle assemblies 145, 146, 147 and 148 provide a continuous separating action of sufficient duration to insuer that substantially all peanuts are separated from the peanut vines to fall between adjacent curved rods 130 before the peanut vines are discharged through the opening 160 at the rear end R of the frame M.

CLEANING SECTION

It is in the cleaning section F of the combine of the invention that the peanuts separted from the peanut vines by the separating section E, by the picking section C, and by the transfer section D are cleaned. As the peanuts enter the cleaning section F of the combine they have dirt, small stones and other debris adhering to them. Moreover, in addition to peanuts, small stones, dirt, pieces of peanut vine, chaff and other debris also pass between the curved rods 130 and through the discharge screen 94 to the cleaning section F of the combine. The cleaning section F of the combine cleans the peanuts and also separates the peanuts from the dirt, chaff and other debris removed from the peanuts and which pass with the peanuts between adjacent curved rods 130.

The cleaning section F of the combine comprises a ridge tray 200 which reciprocates beneath the curved rods 130 of the vine rack 120 so as to clean the peanuts, a slatted platform 241 to which the peanuts and debris fall from the tray 200, and a blower 202 which blows air through the slatted platform 241 to separate the peanuts from debris. The tray 200 comprises a right side member 203 extending parallel to the right side 20 of the frame M, a left side member 204 extending parallel to the left side 21 of the frame M, and a substantially horizontal bottom plate 205 extending between the right side member 203 and the left side member 204.

The bottom plate 205 is formed as a plurality of ridges extending parallel to each other between the side members 203 and 204. Each of the plurality of ridges 206 has a substantially vertical portion 207 and an inclined portion 208 extending from the upper edge of the vertical portion 207 downward and toward the front end N of the frame M to the lower edge of the vertical portion 207 of an adjacent ridge 206. Thus, when the bottom plate 205 is viewed in section in a vertical plane of reference parallel to and between the side members 203 and 204, the bottom plate 205 has a sawtooth appearance. The side members 203 and 204 extend upward above the bottom plate 205 to prevent peanuts and debris from falling from the tray 200 toward the sides 20 and 21 of the frame M.

That end of the tray 200 beneath the discharge screen 94 is supported by extending a right front lever arm 210 between the right side member 203 of the tray 200 and the right side 20 of the frame M and by extending a left front lever arm 211 between the left side member 204 of the tray 200 and the left side 21 of the frame M. The right front lever arm 210 has an upper hub 214 at its upper end and a lower hub 215 at its lower end and the right front lever arm 210 is pivotally attached to the right side member 203 by mounting an upper right front bearing pin 216 to the right side member 203 and inserting the upper front bearing pin 216 through the upper hub 214. The left front lever arm 211 has an upper hub 218 and a lower hub 219 and is attached to the left side member 204 of the tray 200 by extending an upper left front bearing pin 220 from the left side member 204 through the upper hub 218. The lower hubs 215 and 219 of the front lever arms 210 and 211 are pivotally attached to the sides 20 and 21 by extending a front bearing shaft 217 between the sides 20 and 21 and through the lower hubs 215 and 219.

That end of the tray 200 beneath the paddle assembly 146 is supported by extending a right rear lever arm 212 between the right side member 203 of the tray 200 and the right side 20 of the frame M and by extending a left rear arm 213 between the left side member 204 of the tray 200 and the left side 21 of the frame M. The right rear lever arm 212 has an upper hub 214' at its upper end and a lower hub 215' at its lower end and the right rear lever arm 212 is pivotally attached to the right side member 203 of the tray 200 by mounting an upper right rear bearing pin 216' to the right side member 203 and inserting the upper right rear bearing pin 216' through the upper hub 214' of the right lever arm 212. Similarly, the right rear lever arm 212 is pivotally attached to the right side 20 of the frame M by extending a rear bearing shaft 217' from the right side 20 to the left side 21 of the frame M and inserting the rear bearing shaft 217' through the lower hub 215' of the right rear lever arm 212.

The left rear lever arm 213 has an upper hub 218' at its upper end and a lower hub 219' at its lower end and the left rear lever arm 213 is pivotally attached to the left side member 204 of the tray 200 by mounting an upper left rear bearing pin 220' on the left side member 204 and extending the upper left rear bearing pin 220' through the upper hub 218' of the left lever arm 213. The left rear lever arm 213 is pivotally attached to the left side 21 of the frame M by extending the rear bearing shaft 217' through the lower hub 219' of the left rear lever arm 213.

The front lever arms 210 and 211 and the rear lever arms 212 and 213 extend upward toward the tray 200 from the sides 20 and 21 and serve to maintain the tray 200 in a substantially horizontal position while at the same time permitting reciprocating motion of the tray 200. Reciprocating motion is imparted to the tray 200 by an actuating rod 222.

The actuating rod 222 extends between a transverse rod 223 and a cam plate 224 attached by welding or other known means to one end of a cam shaft 225 extending through the right side 20 of the frame M. The transverse rod 223 extends between a right tab 226 extending downward from the right side member 203 of the tray 200 and a left tab extending downward from the left side member 204 of the tray 200. The transverse rod 223 is freely rotatable in the tabs 226 and 227 and the actuating rod 222 is fixedly attached to the transverse rod 223 midway between the tabs 226 and 227. That end of the actuating rod 222 attached to the cam plate 224 is integral with a rod hub 228 and the actuating rod 222 is pivotally attached to the cam plate 224 by extending a cam pin 229 integral with the cam plate 224 through the rod hub 228. The cam shaft 225 is rotatably positioned using brackets 230 mounted on a support bar 231 extending from the right side 20 of the frame M beneath the cam shaft 225.

The result of the foregoing arrangement is that as the cam shaft 225 is rotated the rod hub 228 is moved in a circular path by the cam plate 224 and the circular path of the rod hub 228 imparts a reciprocating motion to the actuating rod 222. The reciprocating motion of the actuating rod 222 causes a corresponding reciprocating motion of the transverse rod 223, the tabs 226 and 227, and the tray 200. As the tray 200 reciprocates, the lever arms 210, 211, 212, and 213 pivot about the bearing shafts 217 and 217'.

The attaching of the actuating rod 222 to the transverse rod 223 at the midpoint of the transverse rod 223 between the tabs 226 and 227 insures that the reciprocating motion of the tray 200 resulting from the motion of the actuating rod 222 is parallel to the sides 20 and 21 of the frame M. This is because the actuating rod 222 moves in a vertical plane of reference equidistant from the side members 203 and 204 of the tray 200 and to insure that the actuating rod 222 remains perpendicular to the transverse rod 223, bracing members 233 extend from the actuating rod 222 to the transverse rod 223 between the actuating rod 222 and the tabs 226 and 227. The attaching of the front arms 210 and 211 to the same front bearing shaft 217 and the rear lever arms 212 and 213 to the same rear bearing shaft 217' also aids in maintaining the reciprocating motion of tray 200 parallel to the sides 20 and 21.

It will be understood from the foregoing description of the tray 200 and of the means for supporting the tray 200 for reciprocating motion that the tray 200 will reciprocate as the front lever arms 210 and 211 and the rear leaver arms 212 and 213 pivot about the bearing shafts 217 and 217'. The lever arms 212 and 213 are inclined toward the front end N of the frame M when the tray 200 is horizontal and at its greatest distance from the front end N of the frame M. Thus, as the tray 200 is moved toward the front end N of the frame M with motion of the actuating rod 222, the tray 200 moves downward as the lever arms 210, 211, 212 and 213 pivot toward the front end N of the frame M.

The result of this arrangement is that the actuating rod 222 causes the tray 200 to reciprocate between an uppermost position in which it is horizontal and most remote from the front end N of the frame M and a lowermost position in which it is horizontal and nearest the front end N of the frame M. This reciprocating motion of the tray 200 in a horizontal direction and from an uppermost to lowermost position and the ridges 206 cause peanuts and debris on the tray 200 to move along the tray 200 toward the rear end R of the frame M. This is because the inertia of peanuts and debris on the tray 200 causes the peanuts and debris to move upward along the inclined portions 208 of the ridges 206 as the tray 200 moves toward the front end N of the frame M. The downward motion of the tray 200 aids the motion of the peanuts and debris up the inclined portions 208 of the ridges 206 by tending to remove the tray 200 from beneath the peanuts and debris.

After the peanuts and debris move up the inclined portions 208 of the ridges 206, the peanuts and debris fall downward along the vertical portions 207 of the ridges 206 and as the tray 200 moves toward the rear end R of the frame M, the upward motion of the tray 200 and vertical portions 207 prevent the peanuts and debris from moving relative to the tray 200. Thus, the peanuts and debris tend to advance the distance of one ridge 206 along the tray 200 for each complete cycle of reciprocating motion by the tray 200. The peanuts bounce and strike each other as they advance in this manner and this results in dirt and other debris adhering to the peanuts being shaken off. A plurality of dividers 221 extend the length of the bottom plate 205 between and parallel to the side members 203 and 204 of the tray 200. The dividers serve to prevent peanuts, peanut vines and other material on the tray 200 from sliding to one side of the tray 200 when the tray 200 tilts with the combine because of the terrain over which the combine is passing.

The reciprocating motion of the tray 200 moves the peanuts and debris to that end of the tray 200 beneath the paddle assembly 147 and extending from this end of the tray 200 are a plurality of vine rods 240. The vine rods 240 extend parallel to each other from the tray 200 toward the rear end R of the frame M in a plane substantially parallel to the plane of the tray 200 and are spaced apart a distance which is just sufficient for peanuts to pass between adjacent vine rods 240. Thus, the vine rods 240 serve to separate the cleaned peanuts from debris too large to pass between the vine rods 240 as the peanuts and debris fall from the tray 200 as the result of the reciprocating motion of the tray 200. The peanuts and small pieces of debris not retained by the vine rods 240 pass between the vine rods 240 to the slatted platform 241. The reciprocating motion of the vine rods 240 as they move with the tray 200 insures that substantially all of the peanuts pass between the vine rods 240. The slatted platform 241 comprises a plurality of slats 242 extending parallel to each other between the right vertical flange 265 and the left vertical flange 266 of the stemmer bottom 270. The stemmer bottom 270 is in the stemming section G and its construction is described below. Each of the slats 242 has a shelf portion 243 and a flange portion 244 and the slats 242 are positioned between the vertical flanges 265 and 266 with the shelf portion 243 lying in a plane of reference inclined downward toward the rear end R of the frame M from that end of the tray 200 nearest the rear end R of the frame M. Thus, the shelf portions 243 of the slats 242 define a platform positioned beneath the vine rods 240 and inclined downward from the tray 200 toward the rear end R of the frame M.

The flange portion 244 of each of the plurality of slats 242 is inclined upward from the plane of reference in which the shelf portions 243 of the slats 242 are positioned and the slats 242 are spaced so that slots 245 are formed between the shelf portions 243 of adjacent slats 242 beneath the plurality of flange portions 244. The flange portions 244 do not have sufficient width to extend completely over a slot 245 between the shelf portions 243 of adjacent slats 242 and a plurality of platform rods 246 extend forwardly from each shelf portion 243 beneath each flange portion 244 and over each of the plurality of slots 245. The plurality of platform rods 246 extending from the shelf portion 243 of each of the plurality of slats 242 extend parallel to each other in a substantially horizontal plane.

Positioned above the shelf portions 243 of the slats 242 and extending through the flange portions 244 of the slats 242 are a plurality of fishback members 235. The fishback members 235 extend parallel to each other and parallel to and between the vertical flanges 265 and 266 of the stemmer bottom 270. The lower edge 236 of each fishback member 235 is attached to the plurality of shelf portions 243 over which the fishback member 235 extends and the upper edge of each fishback member 235 is a plurality of segments 237 with each segment 237 substantially horizontal. The fishback members 235 and the platform rods 246 extending from that slat 242 nearest the rear end R of the frame M extend toward the rear end R of the frame M beyond the slatted platform 241 to provide an extension of fishback members 235 and platform rods 246 at the lower end of the slatted platform 241.

The result of the foregoing arrangement of slats 242, fishback members 235, and platform rods 246 is that peanuts and small pieces of debris falling between the vine rods 240 toward the slatted platform 241 fall to the slatted platform 241 between adjacent fishback members 235 and that large clumps of peanuts and peanut vines or large pieces of debris falling between the vine rods 240 toward the slatted platform 241 come to rest across the fishback members 235 above the slatted platform 241. In addition to supporting large clumps of peanuts and peanut vines and large pieces of debris, the fishback members 235 serve to prevent shifting and accumulation of the peanuts at one side of the slatted platform 241 when the slatted platform 241 and the combine are tilted by the terrain over which the combine is moving.

A blower 202 is positioned in known manner within the frame M below the tray 200. The blades 251 of the blower 202 are rotated by a shaft 252 and the blower casing 253 is continuous with a duct 254 extending toward the underside of the slatted platform 241. Thus, when the shaft 252 is rotated, air is directed by the duct 254 against the underside of the slatted platform 241. This air from the blower 202 passes through the slots 245 between adjacent slats 242 and the flange portions 244 of the slats 242 cause the air to pass through the slots 245 in an upward direction toward the rear end R of the frame M and the opening 160.

The stemmer bottom 270 is reciprocated in a manner described below and the reciprocating motion of the stemmer bottom 270 causes the slatted platform 241 to move toward and away from the rear end R of the frame M in a reciprocating manner. The motion of stemmer bottom 270 also causes the slatted platform 241 to raise as the slatted platform 241 moves toward the rear end R of the frame M and to lower as the slatted platform 241 moves away from the rear end R of the frame M.

The result of this arrangement is that large clumps of peanut vines and peanuts or large pieces of debris resting on the fishback members 235 tend to be tossed and blown upward and to bounce downward along the fishback members 235. This motion of large clumps of peanut vines and peanuts or of large pieces of debris causes them to disintegrate. With disintegration, most of the peanut vines and debris in the large clumps of peanut vines and peanuts and large pieces of debris are blown by the air through the opening 160 and the peanuts, and some small pieces or clumps of peanut vines, and some debris fall to the slatted platform 241, The peanuts, small pieces or clumps of peanut vines, and debris falling to the slatted platform from large clumps of peanuts and peanut vines or large pieces of debris as described above or falling directly to the slatted platform 241 from between the pine rods 240 move downward along the shelf portions 243 of the slats 242 because of gravity and the motion of the slatted platform 241. As a result, the peanuts and small pieces or clumps of peanut vine, and debris move upward along the flange portions 244 of the slats 242 and off the flange portions 244 toward the shelf portions 243 of lower positioned slats 242.

The duct 254 has a fan door 254' adjustably positioned within it so as to vary the flow of air from the duct 254 and the position of the fan door 254' is adjusted to provide currents of air between the slats 242 which are of just sufficient strength to aid the motion of the slatted platform 241 in moving large clumps of peanuts and peanut vines and pieces of debris on the stepped support members 235 in the manner described above and to blow small pieces of peanut vine and debris out the opening 160 as they fall from a disintegrating large clump of peanuts and peanut vines or a large piece of debris or as they pass over the edges of the flange portions 244 of the slats 242. The currents of air are not of sufficient strength to blow the heavier peanuts, small clumps of peanuts and peanut vines, and relatively heavy pieces of debris out of the opening 160.

Thus, as the peanuts and other material of similar weight pass over the flange portions 244 of the slats 242, they are simply blown upward and drop to the shelf portions 243 of lower positioned slats 242. Material too heavy to be blown upward to even this limited extent falls to the platform rods 246 beneath the flange portions 244 and is moved from the platform rods 246 by the motion of the slatted platform 241 to the shelf portions 243 of lower positioned slats 242.

The repeated falling to the slatted platform 241 of small clumps of peanut vines and peanuts and of relatively heavy pieces of debris tossed and blown upward with the peanuts or moved from the platform rods 246 by the motion of the slatted platform causes the small clumps of peanut vines and peanuts and the relatively heavy pieces of debris to disintegrate. This results in the peanuts in the small clumps of peanut vines and peanuts being released to move downward with other peanuts along the slatted platform as described and in the peanut vines and debris being blown out the opening 160. The result of this arrangement is that substantially all of the peanuts reach the lower end of the slatted platform 241 and that substantially all peanut vines, chaff, debris and other materials are removed from the peanuts as the peanuts move downward along the slatted platform 241.

When the peanuts leave the slatted platform 241 they fall toward and through a rod assembly 260 positioned adjacent to the lower end of the slatted platform 241. The rod assembly 260 comprises a transverse member 261 extending between the vertical flanges 265 and 266 of the stemmer bottom 270 and a plurality of screen rods 262 extending parallel to each other from the transverse member 261 toward the rear end R of the frame M in a horizontal plane.

The screen rods 262 are spaced a sufficient distance apart to permit peanuts falling toward the rod assembly 260 to pass between adjacent screen rods 262 and are sufficiently close together to catch peanut vines, chaff and debris which is not blown out of the opening 160 as it passes downward along the slatted platform 241. When the peanuts pass through the rod assembly 260 they enter the stemming section G of the combine and the peanut vines, chaff, and debris caught by the screen rods 262 are blown by the blower 202 upward and out the opening 160.

STEMMING SECTION

The stemming section G of the combine to which the peanuts pass as they fall between adjacent screen rods 262 of the rod assembly 260 comprises a stemmer bottom 270 having a plurality of slits 271 through which a plurality of stemmers 272 extend. The stemmer bottom 270 has a right vertical flange 265 adjacent to the right side 20 of the frame M, a left vertical flange 266 adjacent to the left side 21 of the frame M, and a bottom plate 273 extending between the lower edges of the vertical flanges 265 and 266 and curved upward at that end adjacent to the rear end R of the frame M to form an end flange 274 extending between those vertical edges of the vertical flanges 265 and 266 nearest the rear end R of the frame M. The stemmer bottom 270 is positioned within the frame M with the end flange 274 adjacent to a transverse member 267 at the rear end R of the frame M and with the vertical flanges 265 and 266 and the bottom plate 273 extending toward the front end N of the frame M beneath the rod platform 260 and the slatted platform 241.

A right support member 275 is fixedly attached to the stemmer bottom 270 at the lower edge of the right vertical flange 265 and extends along the right vertical flange 265 and beyond the stemmer bottom 270 toward the front end N of the frame M. Similarly, a left support member 276 is fixedly attached to the stemmer bottom 270 at the lower edge of the left vertical flange 266 and extends along the left vertical flange 266 and beyond the stemmer bottom 270 toward the front end N of the frame M. The support members 275 and 276 extend beyond the stemmer bottom 270 to positions below and on opposite sides of the duct 254 of the blower 202 and it is with the support members 275 and 276 that the stemmer bottom 270 and the slatted platform 241 of the cleaning section F are positioned within the frame M by suspending those ends of the support members 275 and 276 adjacent to the rear end R with a right rear link 277 and a left rear link 278 and those ends of the support members 275 and 276 adjacent to the duct 254 of the blower 202 with a right front link 279 and a left front link 280.

The right rear link 277 has its lower end pivotally attached to a bearing pin 281 mounted on the right support member 275 and its upper end pivotally attached to a transverse support member 805 extending from the right side 20 of the frame M. Similarly, the left rear link 278 has its lower end pivotally attached to a bearing pin 281 mounted on the left support member 276 and its upper end pivotally attached to a transverse support member 806 extending from the left side 21 of the frame M.

The right front link 279 has its lower end pivotally attached to a bearing pin 281 mounted on the right support member 275 and its upper end integral with the lower hub 215' of the right lever arm 212. Similarly, the left front link 280 has its lower end pivotally attached to a bearing pin 281 mounted on the left support member 276 and its upper end integral with the lower hub 219' of the left lever arm 213. The result of this arrangement is that the pivotal motion of the lever arms 212 and 213 caused by the reciprocating motion of the tray 200 causes a corresponding and opposite pivotal motion of the front links 279 and 280.

This pivotal motion of the front links 279 and 280 imparts reciprocating motion toward and away from the rear end R of frame M to both stemmer bottom 270 and slatted platform 241. Thus, the motion of the actuatnig rod 222 causes reciprocating motion of the tray 200, the slatted platform 241, and the stemmer bottom 270. However, the motion of the stemmer bottom 270 and slatted platform 241 is opposite to the motion of the tray 200 in that when the tray 200 is moving away from the rear end R of the frame M, the stemmer bottom 270 and slatted platform 241 are moving toward the rear end R of the frame M. The lengths of the lever arms 212 and 213 and of the front links 279 and 280 and the weights of the tray 200, slatted platform 241 and stemmer bottom 270 are selected so that the forces resulting from the opposing motions of the tray 200 and of the slatted platform 241 and stemmer bottom 270 substantially cancel each other. This significantly eliminates any tendency for the reciprocating motions of the tray 200, the slatted platform 241, and the stemmer bottom 270 to cause unpleasant jarring of the combine or damage to the combine.

The plurality of stemmers 272 are positioned along the lengths of three stemmer shafts 283, 283' and 283" extending between the longitudinal members 10 and 11 of the frame M. There are a plurality of stemmers 272 on each of the stemmer shafts 283, 283' and 283" and on each stemmer shaft 283, 283' and 283" there is a stemmer 272 extending through each of the plurality of slits 271 in the stemmer bottom 270. The slits 271 are in the bottom plate 273 of the stemmer bottom 270 and extend parallel ot each other between the vertical flanges 265 and 266. Each slit 271 is continuous over the three stemmer shafts 283, 283' and 283" and each slit 271 is of sufficient length to permit the reciprocating motion of the stemmer bottom 270 described above without a stemmer 272 striking the stemmer bottom 270.

Each of the stemmers 272 has a blunt sawtooth cutting edge 284 and the slits 271 through which the stemmers 272 extend are spaced apart a distance which is just sufficient for a peanut without its stem to pass between stemmers 272 extending from adjacent slits 271. The stemmer shaft 283 rotates in a clockwise direction as viewed in FIG. 2 and the stemmer shafts 283' and 283" rerotate in a counterclockwise direction as viewed in FIG. 2. This results in a corresponding rotation of the stemmers 272 on the stemmer shafts 283, 283' and 283".

The bottom plate 273 of the stemmer bottom 270 is inclined downward from the rear end R of the frame M and it is to the downward sloping surface of the bottom plate 273 that peanuts fall as they pass between the screen rods 262. The downward slopt of the stemmer bottom 270, the clockwise rotation of stemmers 272 on the stemmer shaft 283, and the motion of the stemmer bottom 270 toward the front end N of the frame M combine to move peanuts along the bottom plate 273 toward the front end N of the frame M. However, the counterclockwise rotation of the stemmers 272 on the stemmer shafts 283' and 283" tends to retard this motion of the peanuts toward the front end N of the frame M and the result is that peanuts move along the bottom plate 273 away from the rear end R of the frame M with an oscillatory motion.

This oscillatory motion of the peanuts and rotation of the stemmers 272 on the stemmer shaft 283 in the opposite direction from the stemmers 272 on the stemmer shafts 283' and 283" cause the peanuts to pass between the stemmers 272 with random and constantly changing positions. Thus, all of the stems are cut from the peanuts as they pass between the stemmers 272 extending from adjacent slits 271 in the bottom plate 273.

After passing the stemmers 272, the peanuts move along the bottom plate 273 to that edge of the bottom plate 273 most remote from the rear end R of the frame M where the peanuts fall off the bottom plate 273 into a delivery auger 500. The delivery auger 500 is of known type and through ducting (not shown) of known type, the delivery auger 500 delivers the peanuts to bins (not shown) or bags (not shown).

POWER DISTRIBUTION

The sections A, B, C, D, E, F and G of the combine of the invention are driven from a single source of power. In the specific embodiment of the invention disclosed herein, the single source of power is a gear box 300 positioned on the cover plate 22 at the front end N of the frame M. A power shaft 301 extends from the gear box 300 to the power take-off apparatus (not shown) of a tractor (not shown) or other means used to move the combine of the invention over windrows of peanut vines.

Also extending from the gear box 300 is a drive shaft 302 having a sprocket wheel 303 fixedly mounted on its extending end. The drive shaft 302 is rotatably positioned above the cover plate 22 by brackets 304 attached to the cover plate 22 of the frame M.

The power shaft 301 and drive shaft 302 are related in known manner by the gear box 300 so that the sprocket wheel 303 rotates in a plane of reference outward of and parallel to the right side 20 of the frame M when the power shaft 301 is rotated.

The axle 84' of the picking cylinder 81 extends through the right side 20 of the frame M and a large sprocket wheel 305 is fixedly mounted on the extending end of the axle 84'. The large sprocket wheel 305 is joined to the sprocket wheel 303 by a chain 306 and the result of this arrangement is that rotation of the sprocket wheel 303 in a clockwise direction as viewed in FIG. 1 causes clockwise rotation of the large sprocket wheel 305 as viewed in FIG. 1 and of the picking cylinder 81 as viewed in FIG. 2.

The axle 84 of the picking cylinder 80 extends through the right side 20 of the frame M and an inner sprocket wheel 307 is fixedly mounted on the extending end of the axle 84. Similarly, the axle 84" of the picking cylinder 82 extends through the right side 20 of the frame M and an inner sprocket wheel 308 is fixedly mounted on the extending end of the axle 84".

A chain 309 extends between the inner sprocket wheel 307 mounted on the axle 84 and an outer sprocket wheel 310 fixedly mounted on the axle 84' outwardly of the large sprocket wheel 305 and a chain 311 extends between the inner sprocket wheel 308 mounted on the axle 84" and an inner sprocket wheel 312 fixedly mounted on the axle 84' between the large sprocket wheel 305 and the right side 20 of the frame M. The result of this arrangement is that rotation of the axle 84' in a clockwise direction as viewed in FIG. 1 causes corresponding clockwise rotation of the axles 84 and 84". Thus, with clockwise rotation of the sprocket wheel 303, the picking cylinders 80, 81 and 82 all rotate in a clockwise direction as viewed in FIG. 2.

The axle 84 has an outer sprocket wheel 272 fixedly mounted on its extending end outwardly of the inner sprocket wheel 307 and the outer sprocket wheel 272 is joined by a chain 313 to an inner sprocket wheel 314 fixedly mounted on the end of the sleeve 65 extending through the right header fender 30. Thus, when the axles 84, 84' and 84" rotate in a clockwise direction as described above, the sleeve 65 is also rotated in a clockwise direction as viewed in FIG. 1 to cause clockwise rotation of the feeder drum 61 as viewed in FIG. 2.

The drive shaft 34 of the pickup drum 32 extends through the right header fender 30 and a sprocket wheel 315 is fixedly mounted on the extending end of the drive shaft 34. An idler sprocket 316 is positioned on the right header fender 30 beneath the sprocket wheel 315 and an idler sprocket 317 is positioned on the right header fender 30 forwardly of the sprocket wheel 315. A chain 318 extends from an outer sprocket wheel 319 fixedly mounted on the sleeve 65 outwardly of the inner sprocket wheel 314 and over the sprocket wheel 315, thence under and around the idler sprocket 316, thence over the idler sprocket 317, and thence back to and around the outer sprocket wheel 319 to its starting point. As is apparent from FIG. 1, this arrangement of the chain 318 causes counterclockwise rotation of the drive shaft 34 when the sleeve 65 is rotated in a clockwise direction as described above. Thus, as the picking cylinders 80, 81, 82 and the feeder drum 61 are rotated in a clockwise direction as described above, the pickup drum 32 is rotated in a counterclockwise direction as viewed in FIG. 2.

The axle 101 of the transfer drum 100 extends through the right side 20 of the frame M and an inner sprocket 320 is fixedly mounted on the extending end of the axle 101. A chain 321 extends from the inner sprocket wheel 320 to an outer sprocket wheel 322 fixedly mounted on the axle 84" outwardly of the inner sprocket wheel 308. As a result, rotation of the axle 84" in a clockwise direction as viewed in FIG. 1 causes clockwise rotation of the inner sprocket wheel 320 and of the axle 101 of the transfer drum 100. Thus, as the picking cylinders 80, 81 and 82 rotate in a clockwise direction as viewed in FIG. 2, the transfer drum 100 also rotates in a clockwise direction as viewed in FIG. 2.

The paddle shaft 149 of the paddle assembly 145 extends through the right side 20 of the frame M and an outer sprocket wheel 323 is fixedly mounted on the extending end of the paddle shaft 149. The outer sprocket wheel 323 is joined by a chain 324 to an outer sprocket wheel 325 fixedly mounted on the axle 101 of the transfer drum 100 outwardly of the inner sprocket wheel 320.

The paddle shaft 149' of the paddle assembly 146 extends through the right side 20 of the frame M and an inner sprocket wheel 326 is fixedly mounted on the extending end of the paddle shaft 149'. The inner sprocket wheel 326 is joined by a chain 327 to an inner sprocket wheel 328 fixedly mounted on the paddle shaft 149 inwardly of the outer sprocket wheel 323. The paddle shaft 149" of the paddle assembly 147 extends through the right side 20 of the frame M and an outer sprocket wheel 328 is fixedly mounted on the extending end of the paddle shaft 149". The outer sprocket wheel 328 is joined by a chain 329 to an outer sprocket wheel 330 fixedly mounted on the paddle shaft 149' outwardly of the inner sprocket wheel 326.

The paddle shaft 149''' extends through the right side 20 of the frame M and a sprocket wheel 331 is fixedly mounted on the extending end of the paddle shaft 149'''. A chain 332 joins the sprocket wheel 331 to an inner sprocket wheel 333 fixedly positioned on the paddle shaft 149" inwardly of the outer sprocket wheel 328. This arrangement of the chains 324, 327, 329, and 332 results in the paddle shafts 149, 149', 149" and 149''' rotating in a clockwise direction as viewed in FIG. 1 when the axle 101 of the feeder drum 100 rotates in a clockwise direction. Thus, the paddle assemblies 145, 146, 147 and 148 all rotate in a clockwise direction as viewed in FIG. 2 as the feeder drum 100 rotates in a clockwise direction as viewed in FIG. 2. A plurality of chain adjustment sprockets 334 positioned on the right side 20 of the frame M and on the right header fender 30 maintain the proper slack in the chains 309, 311, 313, 321, 324, 327, 329 and 332 in the usual and known manner.

The stemmer shafts 283, 283' and 283" extend beyond the right side 20 of the frame M and a pulley 335 is fixedly mounted on the extending end of the stemmer shaft 283, a pulley 336 is fixedly mounted on the extending end of the stemmer shaft 283' and a pulley 337 is fixedly mounted on the extending end of the stemmer shaft 383". A pulley 338 is fixedly mounted on the paddle shaft 149''' inwardly of the sprocket wheel 331 and a belt 339 extends from the pulley 338 to and under the pulley 335, thence over the pulley 336 and under an idler pulley 340 positioned between and below the pulleys 336 and 337, thence over the pulley 337 and under a pulley 341 which drives the delivery auger 500 in known manner, and thence back to and over the pulley 338. An idler pulley 342 maintains the proper tension in the belt 339 and as the paddle assembly 148 rotates in a clockwise direction as viewed in FIG. 2, this arrangement of the belt 339 causes the stemmers 272 on the stemmer shaft 283 to rotate in a clockwise direction, the stemmers 272 on the stemmer shafts 283' and 283" to rotate in a counterclockwise direction, and the delivery auger 500 to discharge peanuts in known manner.

The shaft 252 of the blower 202 extends through the right side 20 of the frame M and a pulley 343 is fixedly mounted on the extending end of the shaft 252. The pulley 343 is joined by a belt 344 to a large pulley 345 fixedly mounted on the axle 101 inwardly of the inner sprocket wheel 32, thus, clockwise rotation of the axle 101 results in clockwise rotation of the blower shaft 252 as viewed in FIG. 2 and causes the blower 202 to force air out of the duct 254 and upward through the slots 245 in the slatted platform 241.

The cam shaft 225 extends through the right side 20 of the frame M and a pulley 347 is fixedly mounted on the extending end of the cam shaft 225. The pulley 347 is joined by a belt 348 to a pulley 349 positioned on the axle 84" of the picking cylinder 82 outward of the outer sprocket wheel 322. Thus, when the picking cylinder 82 is rotated in a clockwise direction as viewed in FIG. 2, the cam shaft 225 is rotated in a clockwise direction as viewed in FIG. 1 to cause reciprocating motion of the tray 200 and the stemmer bottom 270.

OPERATION

It will be understood from the foregoing description of the combine of the invention that as the combine is pulled along and over a windrow of peanut-laden vines by a tractor (not shown) or other means attached to a draw bar 900 extending from the front end N of the combine and with the tractor (not shown) or other means providing power for rotation of the power shaft 301, the pickup drum 32 rotates in a counterclockwise direction as viewed in FIG. 2 and the feeder drum 61, the picking cylinders 80, 81 and 82, the transfer drum 100, the paddle assemblies 145, 146, 147 and 148, and the cam shaft 225 rotate in a clockwise direction as viewed in FIG. 2. The rotation of the cam shaft 225 in a clockwise direction as viewed in FIG. 2 causes reciprocating motion of the tray 200, the slatted platform 241, the rod assembly 260, and the stemmer bottom 272. The result of this arrangement is that motion of the combine along and above a windrow of peanut-laden vines and rotation of the power shaft 301 cause the windrow of peanut-laden vines to be picked up by the combine and the combine to perform those operations necessary to deliver cleaned and stemmed peanuts to bins (not shown) or sacks (not shown).

The peanut-laden vines are picked up by the combine as the pickup drum 32 in the pickup section A of the combine rotates in a counterclockwise direction as viewed in FIG. 2. The counterclockwise rotation of the pickup drum 32 and of the finger shafts 37 as they move upward with rotation of the pickup drum 32 causes substantially all of the windrow of peanut-laden peanut vines to be picked up by the combine and to be delivered to floor 58' beneath the feeder drum 61 where the rods 74 extending from the cylindrical surface 62 of the feeder drum 61 engage the peanut-laden peanut vines and cooperate with the helical walls 77 and 78 to deliver the peanut-laden peanut vines with reduced width to the breastplate 91 beneath the picking cylinders 80 and 81.

The picking fingers 83 of the picking cylinders 80, 81 and 82 aided by the picking fingers 107 extending upward through the breastplate 91 and the discharge screen 94 serve to pick the peanuts from the peanut-laden vines as the peanut-laden vines pass upward along the breastplate 91 and the discharge screen 94 to the transfer section D of the combine. As the mass of peanut vines and peanuts pass along the discharge screen 94 under the picking cylinder 82, picked peanuts drop through the discharge screen 94 to the tray 200 in the cleaning section F of the combine. In the transfer section D of the combine, the mass of peanut vines and remaining picked peanuts is positively transferred by the rotation of the transfer drum 100 from the picking section C to the separating section E of the combine. The discharge screen 94 beneath the transfer drum 100 permits additional picked peanuts to pass to the tray 200 in the cleaning section F of the combine as the mass of peanut vines and peanuts is transferred from the picking section C to the separating section E of the combine.

Thus, the transfer section D and the feeder section B of the combine serve to insure the movement of the peanuts and peanut vines from the windrow upward to the separating section E of the combine. In addition, the feeder section B of the combine serves to permit the combine to pick up a relatively wide windrow of peanut vines without the combine as a whole being as wide as the windrow of peanut vines.

In the separating section E of the combine, the mass of peanut vines and picked peanuts are moved along the separating screen 120 toward the opening 160 at the rear end R of the frame M and the action of the paddles 121 in the separating section E of the combine serves to separate the peanut vines from the picked peanuts remaining in the mass of peanut vines and peanuts. As described above, the separation of peanut vines from picked peanuts and the motion of the mass of peanut vines and picked peanuts along the separating screen 120 are accomplished without substantial shock to the paddles 121 and in a manner which permits substantially all the peanut vines and debris in the windrow of peanut vines to be discharged from the opening 160 at the rear end R of the frame M while substantially all of the picked peanuts delivered to the separating section E fall between curved rods 130 of the separating screen 120.

As peanuts fall between the curved rods 130 of the separating screen 120, they fall to the tray 200 in the cleaning section F of the combine where they join peanuts which have fallen to the tray 200 through the discharge screen 94. As described above, the tray 200 reciprocates and this reciprocating motion of the tray 200 delivers the peanuts to the slatted platform 241 with substantially all the dirt and other debris adhering to the peanuts shaken loose. As the peanuts fall to the slatted platform 241 they pass between the vine rods 240 and the vine rods 240 serve to catch peanut vines and debris so that they are blown through the opening 160 as described above.

The peanuts falling to the slatted platform 241 descend the slatted platform 241 because of the reciprocating motion of the slatted platform 241 and the currents of air passing through the slatted platform 241, and as the peanuts move downward along the slatted platform 241, the peanuts are cleaned of substantially all the debris, dirt and other material which fell with the peanuts to the slatted platform 241. After leaving the lowermost slat 242 of the slatted platform 241, the peanuts fall through the screen rods 262 of the rod assembly 260 to the stemmer bottom 270 where the reciprocating motion of the stemmer bottom 270 causes the peanuts to pass between a plurality of stemmers 272 to the delivery auger 500 which delivers the peanuts with stems cut to bins (not shown) or bags (not shown).

Thus, in passing through the combine of the invention, peanuts attached to peanut vines in a windrow of peanut vines are picked from the peanut vines, separated from the peanut vines and other debris, stemmed, and delivered to bins (not shown) or bags (not shown). The combine of the invention permits this to be accomplished even though the windrow of peanut vines is wider than the combine as a whole and in a highly efficient manner.

It will be obvious to those skilled in the art that many variations may be made in the embodiments chosen for the purpose of illustrating the present invention without departing from the scope thereof as defined by the appended claims.

We claim:

1. A combine including picking means for picking peanuts from peanut-laden vines and having pickup means wider than said picking means for picking up peanut-laden vines having a composite width greater than the width of said picking means; an auger conveyor wider than said picking means positioned between and immediately adjacent both said pickup and picking means for transferring said peanut-laden vines from said pickup means to said picking means while reducing the composite width of said peanut-laden vines to substantially the width of said picking means and where in the vertical and fore and aft spacing of said auger conveyor relative to said pickup means is detailed such that said auger conveyor engages said vines immediately after being released by said pickup means and transfers said vines along a path located at a higher elevation than the axis of said pickup means.

2. In a peanut combine, a main frame section; a picking section including a picking cylinder positioned for rotation within said main frame section and having picking fingers thereon; a pickup section wider than said main frame section for picking up peanut-laden vines from windrows having a composite width greater than the width of said picking cylinder and including a horizontal drive shaft and a plurality of spring fingers carried by said drive shaft for engaging and elevating peanut-laden vines to a position over said shaft; and, a feeder section approximately the width of said pickup section, interposed between said pickup section and said picking cylinder and immediately adjacent with said pickup section and said picking cylinder, said feeder section including a drum mounted for rotation about an axis parallel to said drive shaft said drum having opposed spiral wall sections for moving said peanut-laden vines toward the longitudinal center of said drum and delivering them to said picking cylinder; and, an arcuate floor section beneath said drum and wherein the vertical and fore and aft spacing of said feed drum axis relative to the axis of said pickup section drive shaft is detailed such that the circumference of said opposed spiral wall sections are located in a vertical and fore and aft overlapping relationship with respect to the path of motion of said pickup section spring fingers, whereby said spiral wall sections will engage said vines immediately after being released by said spring fingers and transfer said vines along a path located at a higher elevation than the axis of said pickup section.

3. The structure claimed in claim 2 in which the distance between said spiral wall sections varies from approximately the width of said pickup to the width of said picking cylinder.

4. The structure claimed in claim 3 in which the surface of said drum has a plurality of apertures formed therein.

5. The structure claimed in claim 4 in wrich a plurality of rods are operatively associated with said apertures for projecting through said apertures and engaging said peanut-laden vines to move said vines between said arcuate floor section and said drum.

6. The structure claimed in claim 5 in which said apertures are positioned relative to said spiral wall sections so that a greater number are positioned where the distance between said spiral wall sections is greater.

7. The structure claimed in claim 6 in which said rods are arranged to be retracted with respect to the surface of said drum and disengaged from said peanut vines when moved upwardly past the upper portion of said arcuate floor section.

8. In a peanut combine, a main frame section; a picking section including a picking cylinder positioned for rotation within said main frame section and having picking fingers thereon;

a pickup section wider than said main frame section for picking up peanut-laden vines from windrows having a composite width greater than the width of said picking cylinder and including a horizontal drive shaft, a plurality of band members disposed about said shaft, a plurality of spring fingers carried by said drive shaft for engaging and elevating peanut-laden vines to a position over said shaft whereupon said fingers become disengaged from said vines; and a feeder section approximately the width of said pickup section and including a drum mounted for rotation about an axis parallel to said drive shaft, an arcuate floor section positioned adjacent said band members and beneath said drum, the end portions of said drum having opposed spiral wall sections for moving said peanut-laden vines toward the longitudinal center of said drum, the distance between said wall sections varying from approximately the width of said pickup to the width of said picking cylinder, the surface of said drum having a plurality of apertures formed therein, said apertures being positioned relative to said wall sections so that a greater number are positioned where the distance between said wall sections is wider, and a plurality of rods associated with said apertures for projecting through said apertures and engaging said peanut-laden vines to move said vines between said arcuate floor section and said drum, said rods being arranged to be retracted with respect to the surface of said drum and disengaged from said peanut vines when moved upwardly past the upper portion of said arcuate floor section.

References Cited

UNITED STATES PATENTS

| | | | |
|---|---|---|---|
| 2,256,829 | 9/1941 | Hyman | 56—364 |
| 2,388,212 | 10/1945 | McElhoe et al. | 56—364 |
| 2,517,413 | 8/1950 | Pearson | 56—364 |
| 2,513,966 | 7/1950 | Pool et al. | 56—364 |
| 2,529,180 | 11/1950 | Oehler | 56—20X |
| 2,974,467 | 3/1961 | Long | 56—19 |
| 3,060,665 | 10/1962 | Escher | 56—21 |

RUSSELL R. KINSEY, Primary Examiner

U.S. Cl. X.R.

56—364